(12) United States Patent  (10) Patent No.: US 8,838,643 B2
El Daher et al.  (45) Date of Patent: Sep. 16, 2014

(54) CONTEXT-AWARE PARAMETERIZED ACTION LINKS FOR SEARCH RESULTS

(75) Inventors: Antoine El Daher, Kenmore, WA (US);
Deepak Vijaywargi, Seattle, WA (US);
Yogesh Kant Roy, Bellevue, WA (US);
Taroon Mandhana, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 13/406,181

(22) Filed: Feb. 27, 2012

(65) Prior Publication Data

US 2013/0031078 A1    Jan. 31, 2013

Related U.S. Application Data

(63) Continuation-in-part of application No. 13/190,744, filed on Jul. 26, 2011.

(51) Int. Cl.
*G06F 7/00* (2006.01)
*G06F 17/30* (2006.01)

(52) U.S. Cl.
CPC ............... *G06F 17/30867* (2013.01)
USPC ........................................ 707/777

(58) Field of Classification Search
CPC ............................................... G06F 17/30893
USPC ........................................ 707/777
See application file for complete search history.

(56) References Cited

U.S. PATENT DOCUMENTS

| 5,794,259 | A * | 8/1998 | Kikinis | 715/207 |
|---|---|---|---|---|
| 7,702,678 | B2 | 4/2010 | Teague | |
| 7,788,274 | B1 | 8/2010 | Ionescu | |
| 7,836,009 | B2 | 11/2010 | Paczkowski et al. | |
| 7,930,384 | B1 | 4/2011 | Lester et al. | |
| 2007/0038641 | A1 * | 2/2007 | Fawcett et al. | 707/10 |
| 2007/0198741 | A1 | 8/2007 | Duffy et al. | |
| 2007/0255735 | A1 | 11/2007 | Taylor et al. | |
| 2007/0283425 | A1 | 12/2007 | Ture et al. | |
| 2008/0005072 | A1 | 1/2008 | Meek et al. | |
| 2008/0133540 | A1 | 6/2008 | Hubbard et al. | |
| 2008/0200154 | A1 | 8/2008 | Maharajh et al. | |
| 2008/0313574 | A1 | 12/2008 | Aravamudan et al. | |

(Continued)

OTHER PUBLICATIONS

Non-Final Office Action mailed Jul. 31, 2013 in U.S. Appl. No. 13/190,744, 18 pages.

(Continued)

*Primary Examiner* — Fred I Ehichioya
*Assistant Examiner* — Kris Mackes
(74) *Attorney, Agent, or Firm* — Dave Ream; Doug Barker; Micky Minhas

(57) ABSTRACT

Parameterized actions are provided with search results to allow users to enter parameter values and perform the actions directly from the search results. By analyzing websites in a category, a parameterized action available at the websites and common parameters may be identified. When an end user performs a search that returns a web page result from a website having the parameterized action, an indication of the parameterized and common parameters may be provided as part of the search result. Additionally, user interface elements may allow the end user to enter parameter values to perform the parameterized action directly from the search result. In some instances, user context may be employed to pre-populate parameter values in the search result.

20 Claims, 15 Drawing Sheets

(56) References Cited

U.S. PATENT DOCUMENTS

| | | |
|---|---|---|
| 2009/0089245 A1 | 4/2009 | Chi |
| 2009/0193007 A1 | 7/2009 | Mastalli et al. |
| 2009/0204579 A1 | 8/2009 | Govani et al. |
| 2009/0204610 A1 | 8/2009 | Hellstrom et al. |
| 2009/0325556 A1 | 12/2009 | Lee et al. |
| 2010/0049709 A1 | 2/2010 | Ravikumar et al. |
| 2010/0114908 A1 | 5/2010 | Chand et al. |
| 2010/0223244 A1 | 9/2010 | Sinha et al. |
| 2010/0228731 A1 | 9/2010 | Gollapudi |
| 2010/0250528 A1 | 9/2010 | Punera et al. |
| 2011/0072046 A1 | 3/2011 | Chi |
| 2011/0087647 A1 | 4/2011 | Signorini et al. |
| 2011/0119269 A1 | 5/2011 | Agrawal et al. |
| 2011/0125759 A1 | 5/2011 | Querel et al. |
| 2011/0131241 A1 | 6/2011 | Petrou et al. |
| 2011/0137989 A1 | 6/2011 | Kiciman et al. |
| 2011/0191316 A1 | 8/2011 | Lai et al. |
| 2011/0225192 A1 | 9/2011 | Imig et al. |
| 2011/0252060 A1 | 10/2011 | Broman et al. |
| 2011/0258032 A1 | 10/2011 | Vadlamani et al. |
| 2011/0264673 A1 | 10/2011 | White et al. |
| 2011/0295861 A1* | 12/2011 | Lacasse ........................ 707/749 |
| 2012/0023089 A1 | 1/2012 | Chandra et al. |

OTHER PUBLICATIONS

Guess, Angela, "Bing Further Leverages the Semantic Web with Action Buttons", Published on: Sep. 26, 2011, Available at: http://semanticweb.com/bing-further-leverages-the-semantic-web-with-action-buttons_b23447.

Zhao, et al., "Predicting Short-Term Interests Using Activity-Based Search Context", In Proceedings of the 19th ACM International Conference on Information and Knowledge Management, vol. 36, Issue 4, Aug. 2006, pp. 873-886.

Bayer, Derek, "Bing: Decision Engine Instead of Search Engine?", Retrieved on: Apr. 20, 2011, Available at:http:// www.derekbayer.com/bing-decision-engine-instead-of-search-engine.

D'Technology Weblog, "Bing Bar Lands with Search, Alerts, Facebook, Mail and Bing Reward", Retrieved on: Apr. 20, 2011, Available at:http://www.ditii.com/2011/02/17/bing-bar-lands-with-search-alerts-facebook-mail-and-bing-reward/.

Henzinger, Monika, "Link Analysis in Web Information Retrieval", In Proceedings of Bulletin of the IEEE Computer Society Technical Committee on Data Engineering, vol. 23, Issue 3, Sep. 2000, pp. 3-8.

Kammenhuber, et al., "Web Search Clickstreams", In Proceedings of Internet Measurement Conference, Oct. 25-27, 2006, 6 pages.

Lakkaraju, et al., "Unified Modeling of User Activities on Social Networking Sites", In Proceedings of NIPS Workshop on Computational Social Science and the Wisdom of Crowds, 2011, pp. 1-5.

Mika, Peter, "Ontologies Are Us: A Unified Model of Social Networks and Semantics", In Proceedings of ISWC vol. 3729, Nov. 2005, pp. 522-536.

Seo, et al., "Generalized Link Suggestions via Web Site Clustering", In proceedings of the 20th international conference on World wide web, Mar. 28-Apr. 1, 2011, 10 pages.

Shazly, et al., "Profile-Based Mood Extraction from a Social Network", In Proceedings of International Conference on Internet Computing, Jul. 17, 2011, 7 pages.

Sizemore, Everett, "Building Deep Links into E-Commerce Product Pages", Retrieved on: Apr. 20, 2011, Available at:http://www.seomoz.org/blog/building-deep-links-into-ecommerce-pages.

Taksa, et al., "A Task-oriented Approach to Search Engine Usability Studies", In Journal of Software, vol. 3, No. 1, Jan. 2008, pp. 63-73.

Final Office Action in U.S. Appl. No. 13/190,744, mailed Feb. 26, 2014, 26 pages.

Non Final Office Action in U.S. Appl. No. 13/406,192, mailed Mar. 27, 2014, 40 pages.

Non Final Office Action in U.S. Appl. No. 13/406,203, mailed May 9, 2014, 32 pages.

Final Office Action in U.S. Appl. No. 13/528,508, mailed May 23, 2014, 42 pages.

Kang, "Trnasactional Query Identification in Web Search", AIRS 2005, Springer-Veriag, Berlin Heidelberg, 2005, pp. 221-232.

* cited by examiner

US 8,838,643 B2

CONTEXT-AWARE PARAMETERIZED ACTION LINKS FOR SEARCH RESULTS

CROSS-REFERENCE TO RELATED APPLICATIONS

This application is a continuation-in-part of U.S. patent application Ser. No. 13/190,744, filed Jul. 26, 2011, which is herein incorporated by reference in its entirety. This application is also related by subject matter to the inventions disclosed in the following U.S. patent applications filed on even date herewith: U.S. application Ser. No. 13/406,192, entitled "Personalized Deeplinks for Search Results;" and U.S. application Ser. No. 13/406,203, entitled "Surfacing Actions from Social Data;" which are assigned or under obligation of assignment to the same entity as this application, and incorporated in this application by reference.

BACKGROUND

The amount of information and content available on the Internet continues to grow exponentially. Given the vast amount of information, search engines have been developed to facilitate web searching. In particular, users may search for information and documents by entering search queries comprising one or more terms that may be of interest to the user. After receiving a search query from a user, a search engine identifies documents and/or web pages that are relevant based on the terms. A search page is returned with a list of hyperlinks to "landing pages" that correspond with the identified documents and/or web pages. Because of its utility, web searching, that is, the process of finding relevant web pages and documents for user-issued search queries has arguably become one of the most popular services on the Internet today. However, in some instances, when a user selects a search result and accesses a landing page, although that landing page may be within a website (i.e., collection of web pages within a given domain) that contains the information the user is after, that particular landing page may not have the relevant information. As a result, the user may have to browse or search pages within the website to find the information the user is seeking.

In some cases, a user may be performing certain actions on web pages that require the user to enter values for parameters of the action. For instance, the user may be searching for houses that meet the user's criteria, such as location, number of bedrooms, number of bathrooms, minimum price, and maximum price. To do so, the user may need to find a real estate website, go to a web page within that website for searching for houses, and enter criteria to find houses at that website that meet the user's criteria. If the user wanted to find houses at other real estate websites that meet the same criteria, the user may need to repeat the same process of visiting the website, finding the relevant web page, and entering the user's criteria. This may be a time-consuming and inefficient process for the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to providing parameterized actions with search results and pre-populating parameter values based on user context. A parameterized action is an action available at a website that allows an end user to specify certain parameters for performance of the action. By categorizing websites and analyzing websites within a particular category, a parameterized action common to the websites and common parameters for the action may be identified. When a search query is received that returns a web page result from a website that includes the parameterized action, the parameterized action may be provided as part of the search result. The parameterized action includes an indication of the action and available parameters, as well as user interface elements that allow a user to enter parameter values. As such, the end user may access the parameterized action directly from the search result. In some instances, the parameter values may be pre-populated in the search result based on user context, such as parameter values previously provided by the end user or known information for the end user.

BRIEF DESCRIPTION OF THE DRAWINGS

The present invention is described in detail below with reference to the attached drawing figures, wherein.

DETAILED DESCRIPTION

Figure 1:
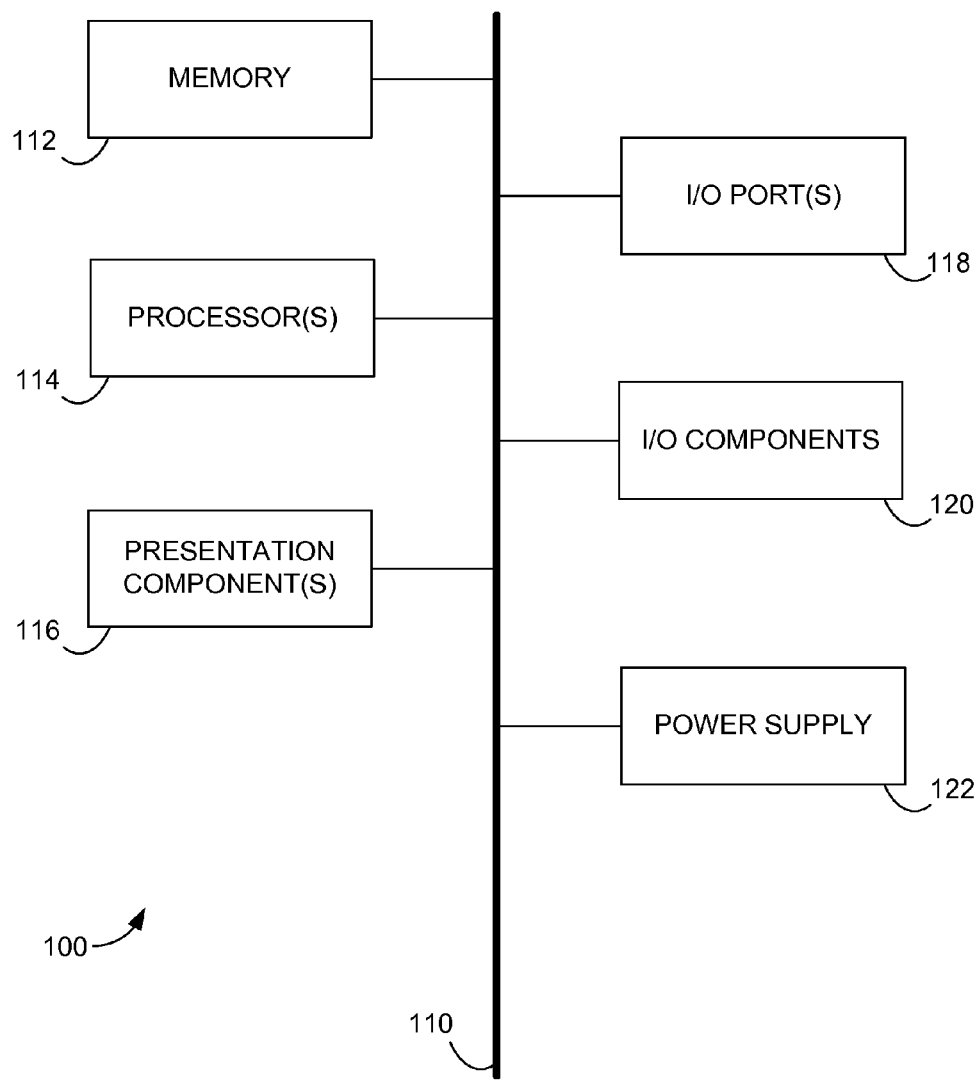
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As discussed above, one problem that users may face when employing search engines is that although a search result returned may correspond with a web page within a website containing the relevant information the user is seeking or a particular action the user wishes to perform, the user may be required to browse the website after selecting the search result to find the information or to perform the action. For instance, suppose a user wishes to check into a flight on an airline. The user may issue a search query for the airline and receive search results that include a hyperlink to the main web page of the website for the airline. After selecting the hyperlink to the main web page for the airline, the user would then need to find a location within the web site for checking into the flight. In some cases, this may be a time-consuming task.

One approach to addressing this problem has been the inclusion of deeplinks in search results on search result pages. As used herein, the term "deeplinks" refers to additional hyperlinks that are provided in association with a matching search result. In other words, a search result may include a hyperlink to a main destination web page, as well as deeplinks to other web pages to which the main destination web page links. For instance, in the example above, the main web page for the airline (i.e., the main destination web page) may include a hyperlink to a web page within the airline's website for logging into flights for the airline. Accordingly, a hyperlink to the location for checking into flights for the airline could be included as a deeplink in association with the hyperlink to the main web page for the airline provided as a search result to a user's search query. Although deeplinks allow users to more quickly access the information they are seeking or perform particular actions, the deeplinks included in search results vary from web page to web page, resulting in a fragmented experience for users. As a result, users may not quickly recognize a deeplink and may even simply select the hyperlink to the main destination web page for the search result, thereby missing out on the benefits of the deeplinks.

Some embodiments of the present invention are directed to providing action-based deeplinks with search results to provide a more consistent experience across web pages within a category of web pages. The action-based deeplinks link to locations that allow users to perform actions that are common to a given web page category. For instance, suppose that a web page category is an airline category, which includes the web pages of different airlines. The action-based deeplinks that may be provided would link to locations within the airline websites that allow users to perform airline-related actions such as checking into flights, check the status of flights, and booking flight reservations. To provide a consistent experience, the search results for airline web pages returned in response to search queries may have the same type of action-based deeplinks. While the action-based deeplinks are similar to traditional deeplinks, the action-based deeplinks differ from traditional deeplinks in that while traditional deeplinks are specific to a given web page, the action-based deeplinks are similar for web pages within a given category, thereby providing a more consistent user experience. This approach makes it easier for users to quickly navigate to a desired location and perform key tasks, thereby reducing the overall time required to perform the tasks.

In some aspects, action-based deeplinks may be identified for web pages by first categorizing web pages into a variety of categories. Each category is then analyzed to identify action-based deeplinks for web pages in each category. For a given category, hyperlinks within web pages of that category are identified and grouped into a number of clusters. Each cluster may correspond with a particular action users perform when visiting the web pages. For instance, in the example of airlines categories, the actions may include checking into a flight, check the status of a flight, and making flight reservations. Hyperlinks are identified within web pages that allow users to perform each action. Based on that information, action-based deeplinks may be provided when returning search results for those web pages. Again, because the action-based deeplinks may be similar among web pages within a given category, a more consistent user experience may be provided that allows users to more quickly perform desired tasks.

Some action-based links may correspond with parameterized actions that may be performed at websites. As used herein, a "parameterized action" is an action in which the end user may specify values for various parameters of the action. For instance, a parameterized action at real estate websites may be a "find house" action that allows an end user to search for houses by specifying criteria such as location, number of bedrooms, number of bathrooms, minimum price, and maximum price.

Accordingly, a parameterized action common to a particular category of websites may be identified, as well as common parameters available for the parameterized action at those websites. Additionally, a general uniform resource location (URL) structure for the parameterized action may be determined for each website by accessing user browsing history information and analyzing the structure of URLs providing the parameterized action at each website.

When a search is performed that returns a web page result from a website having a parameterized action, the search result generated may include an identification of the parameterized action and associated parameters, as well as user interface (UI) elements that allow a end user to enter parameter values. As such, the end user may enter parameter values and select to perform the parameterized action directly from the search result.

Additionally, user context information may be used to pre-populate parameter values for parameterized actions in search results. For instance, when an end user enters parameter values for a parameterized action in a search result, those parameter values may be stored. The stored parameter values may then be used in subsequent searches that return results having the same parameterized action such that the parameter values are pre-populated. In other instances, other user context information may be used to pre-populate parameter values. For example, information about the user, such as a user's current location, may be automatically determined and used to pre-populate parameters directed to the user's location.

Accordingly, in one aspect, an embodiment of the present invention is directed to one or more computer storage media storing computer-useable instructions that, when used by one or more computing devices, cause the one or more computing devices to perform a method. The method includes identifying websites within a particular category and identifying a common action performed on the websites within the particular category as a parameterized action. The method also includes determining a set of common parameters for the parameterized action and determining a general URL structure for the parameterized action for a first website from the websites within the particular category. The method further comprises storing information regarding the parameterized action and the set of common parameters for the parameterized action. The method still further includes storing information regarding the general URL structure for the parameterized action for the first website.

In another embodiment, an aspect is directed to one or more computer storage media storing computer-useable instructions that, when used by one or more computing devices, cause the one or more computing devices to perform a method. The method includes receiving parameter values for parameters of a parameterized action at a website, the parameter values having been entered by an end user in a search result exposing the parameterized action and returned in response to a search from the end user. The method also includes identifying a known URL structure for the parameterized action. The method further includes generating a URL using the known URL structure and the parameter values. The method still further includes storing the parameter values for use in subsequent search queries from the end user.

A further embodiment of the present invention is directed to a method that includes identifying a parameterized action common to websites within a particular category and identifying a set of common parameters for the parameterized action. The method also includes receiving a search query from an end user and identifying a web page corresponding with a first website within the particular category in response to the search query. The method further includes generating a search result that includes an indication of the parameterized action and the parameters for the parameterized action, the search result also include UI elements that allow the end user to enter parameter values for the parameters. The method also includes providing the search result for presentation to the end user. The method further includes receiving parameter values entered by the end user into the UI elements of the search result corresponding with the set of parameters for the parameterized action and generating a URL using the parameter values and a general URL structure for the parameterized action at the first website. The method also includes storing the parameter values. The method further includes receiving a second search query from the end user and identifying a second web page corresponding with a second website within the particular category in response to the second search query. The method also includes generating a second search result that includes an indication of the parameterized action and the parameters for the parameterized action, the second search result also include UI elements that are pre-populated with the stored parameter values for the parameters. The method still further includes providing the second search result for presentation to the end user.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not include signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Action-Based Deeplinks

Figure 2:
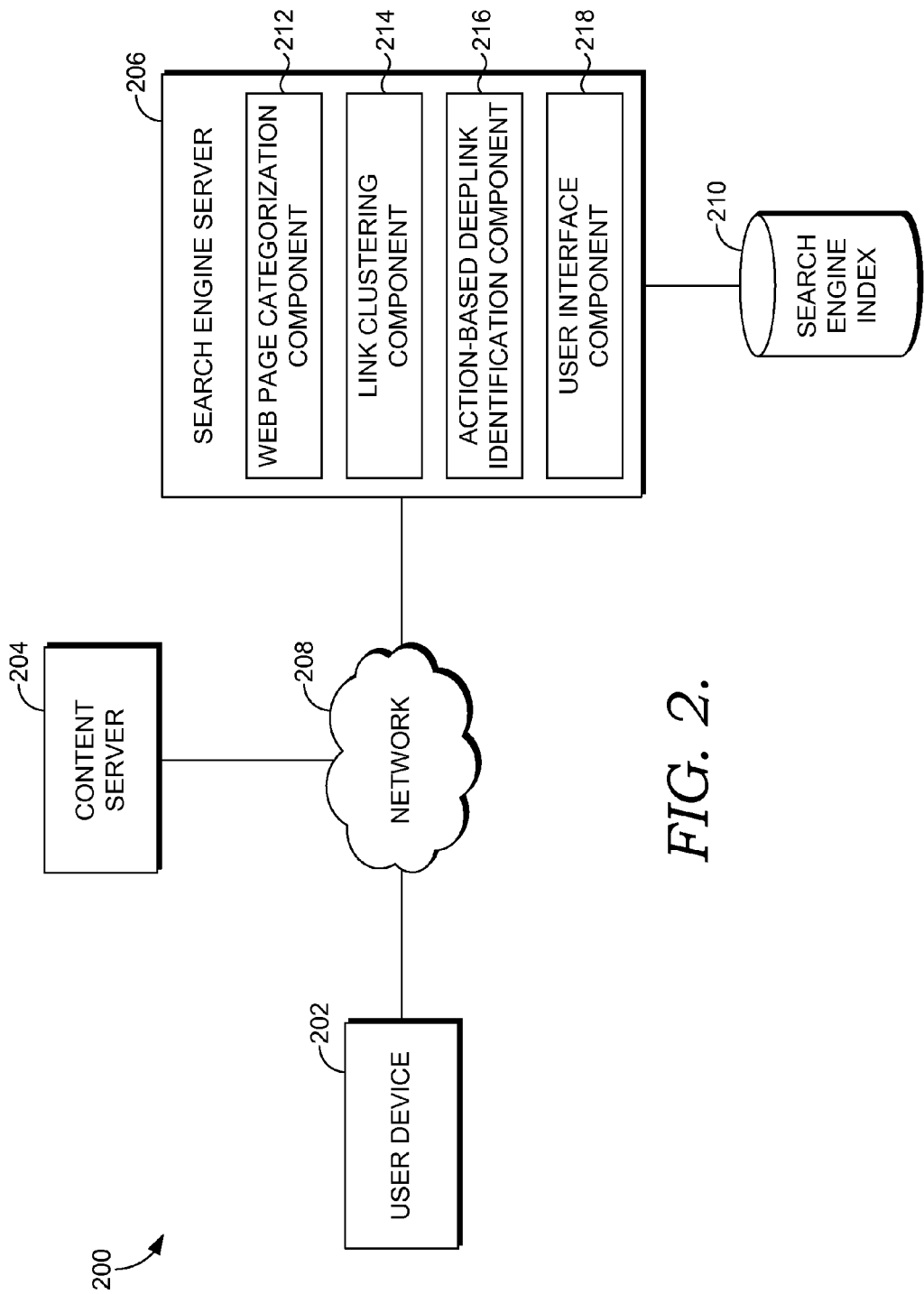
FIG. 2 is a block diagram of an exemplary system in which embodiments of the invention may be employed.

As previously indicated, action-based deeplinks may be provided with search results to allow users to access and perform actions that are common to web pages within a given category. Referring to FIG. 2, a block diagram is provided illustrating an exemplary system 200 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a user device 202, content server 204, and search engine server 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 200 within the scope of the present invention. Each may comprise a single device or multiple devices cooperating in a distributed environment. For instance, the search engine server 206 may comprise multiple devices arranged in a distributed environment that collectively provide the functionality of the search engine server 206 described herein. Additionally, other components not shown may also be included within the system 200.

The search engine server 206 generally operates to index information regarding web pages served by content servers, such as the content server 204, in a search engine index 210. When the search engine server 206 receives search queries from user devices, such as the user device 202, the search engine queries the search engine index 210 to identify search results based on the users' search queries and returns those search results to the user devices. In accordance with embodiments of the present invention, the search engine server 206 is also configured to identify action-based deeplinks for some web pages and to provide those action-based deeplinks when providing search results corresponding with those web pages.

In the embodiment shown in FIG. 2, the search engine server 206 includes, among other things, a web page categorization component 212, a link clustering component 214, an action-based deeplink identification component 216, and a user interface component 218.

The web page categorization component 212 operates to identify a category for each of a number of different web pages served by content servers, such as the content server 204, and indexed in the search engine index 210. As a result, web pages are clustered together into various categories. By way of example only and not limitation, the web page categorization component 212 may identify web pages within a restaurants category, hotels category, airlines category, and social networks category, to name a few.

Web page categorization may be performed in any of a number of different manners within the scope of embodiments of the present invention. In some embodiments, the categorization may be based on an existing repository of web page categorizations, such as the Open Directory Project (ODP). In some embodiments, web pages may be automatically grouped together into categories by analyzing the content of the pages. For instance, clustering techniques may be employed to cluster the web pages based on their content. As another example, the web pages may be categorized by looking for particular keywords in the content of the web pages. Web page categorization could also be automatically performed by analyzing the hyperlinks within the content of the web pages. Web page categorization may also include a manual approach based on editorial review of web pages to manually place the web pages into the different categories. In still further embodiments, a sample of manually-categorized web pages may be used as seeds for an automatic approach in which other web pages are compared against the seed web pages to categorize the other web pages. Any and all such variations and combinations thereof are contemplated to be within the scope of embodiments of the present invention.

The link clustering component 214 operates to cluster hyperlinks found on web pages within each category. For a given category, the link clustering component 214 may analyze hyperlinks contained within the web pages within that given category to cluster the hyperlinks into a number of clusters. The clustering may be performed in some embodiments by analyzing the words in the anchor text of the hyperlinks. As is known in the art, the anchor text refers to the displayed text of a hyperlink. Hyperlinks containing similar words would be clustered together. In some embodiments, the content of each hyperlink's destination web page may be analyzed to cluster the hyperlinks. In still further embodiments, the clustering may include manual review of hyperlinks and/or destination web pages of the hyperlinks to facilitate clustering.

In some embodiments, the link clustering component 214 may analyze and cluster all hyperlinks within each web page within the category. In other embodiments, the link clustering component 214 may cluster only a portion of hyperlinks from the web pages. For instance, the link clustering component 214 may consider only the hyperlinks that meet some threshold based on user clicks on the hyperlinks. In some embodiments, the search engine server 206 may receive click-through data collected by web browsers, search toolbars, or other mechanisms on user devices, such as the user device 202. The click-through data may indicate the hyperlinks that users have clicked within web pages when viewing those web pages. Based on such click-through data, the most-clicked hyperlinks on a given web page may be identified and only those hyperlinks considered by the link cluster component 214. For instance, only the hyperlinks that have received a threshold number of clicks or that have a threshold click-through rate (i.e., the percentage of web page visits for the web page that have resulted in a click on the hyperlink) may be considered.

In some embodiments, the search engine server 206 may be configured to provide traditional deeplinks. In such embodiments, the link clustering component 214 may consider only hyperlinks corresponding with the deeplinks for the web page. All deeplinks may be considered in some embodiments, while only a portion of the deeplinks may be considered in other embodiments. For an example of the latter, the search engine server 206 may track user clicks of deeplinks from search results. Based on such click data, the search engine server 206 may identify the hyperlinks that correspond with the most-clicked deeplinks and only those hyperlinks considered by the link cluster component 214. For instance, only the hyperlinks that correspond with deeplinks that have received a threshold number of clicks or that have a threshold click-through rate (i.e., the percentage of search results for the web page that have resulted in a click on the deeplink) may be considered.

Based on the clustering of hyperlinks from the link clustering component 214, the action-based deeplink identification component 216 may identify one or more different types of actions for the web page category being analyzed. In particular, each action may correspond with a type of action users perform using hyperlinks within a cluster of hyperlinks. For instance, if the web page categorization being analyzed is an airlines category, a first cluster of hyperlinks may correspond with locations for checking into flights, a second cluster of hyperlinks may correspond with locations for checking the status of flights, and a third cluster of hyperlinks may correspond with locations book making flight reservations. As such, a check in action may be identified based on first cluster of hyperlinks, a check status action may be identified based on the second cluster of hyperlinks, and a reservations action may be identified based on the third cluster of hyperlinks.

In some embodiments, the action-based deeplink identification component 216 may consider each cluster identified by the link clustering component 214 and identify an action for each of those clusters. In other embodiments, only clusters that meet some threshold may be processed by the action-based deeplink identification component 214 to identify an action for each of those clusters. For instance, in some embodiments, only clusters that include a threshold number of hyperlinks may be further processed by the action-based deeplink identification component 214. In some embodiments, click-through rates for each hyperlink in a cluster may be analyzed to determine whether to process the cluster. In such embodiments, actions may be identified only for clusters with hyperlinks that satisfy a threshold level of click-throughs. The click-through data may represent user clicks on hyperlinks when visiting the web page. Such click-though data may be collected by web browsers, search engine tool bars, or other mechanisms on user devices, such as the user device 202, and provided to the search engine server 206. In instances in which the hyperlinks correspond with deeplinks, deeplink click-through data may be employed. The deeplink click-through data represents user clicks on deeplinks presented in search results.

After identifying an action for a web page category, the action-based deeplink identification component 216 may identify, for web pages within the category, hyperlinks that correspond with that action. For instance, if the web page category being analyzed is an airlines category and an identified action is checking into flights, hyperlinks on web pages within the category that link to locations that allow users to check into flights would be identified as corresponding with that action. The URL for those locations or other information may then be stored in association with each web page in the search engine index 210 to allow for providing action-based deeplinks when returning search results to search queries.

A hyperlink corresponding with an action may be identified for web pages within a given category in a number of different ways. In some instances, the hyperlinks may be identified from the cluster of hyperlinks for that action. In some cases, a web page may not have had a hyperlink placed in that cluster. For such a web page, hyperlinks from that web page may be analyzed to identify a hyperlink that corresponds with the action. This may include, for instance, automatically analyzing the anchor text of hyperlinks and/or the content of the destination web pages of the hyperlinks to identify a hyperlink that corresponds with the action. For instance, the anchor text or content of the destination web page for a hyperlink may be compared against the anchor text and/or destination web page content for hyperlinks in the cluster of hyperlinks used to identify the action. In some embodiments, editors may manually review web pages to identify hyperlinks that correspond with an action. Any and all such variations and combinations thereof are contemplated to be within the scope of embodiments of the present invention.

In some embodiments, a hyperlink may be identified for a particular action for only a portion of web pages in the category. In other embodiments, a hyperlink for an action may be identified for most or even all web pages in the category. In this way, an action-based deeplink may be provided with search results for the web pages in the category to provide users with a consistent experience. This would allow users to more quickly get to the information and perform desired actions.

The user interface component 218 provides an interface to user devices, such as the user device 202, that may allow users to submit search queries to the search engine server 206 and to receive search results from the search engine server 206. It should be understood that the user device 202 may be any type of computing device employed by a user to submit search queries and receive search results. By way of example only and not limitation, the user device 202 may be a desktop computer, a laptop computer, a tablet computer, a mobile device, or other type of computing device. The user device 202 may include an application that allows a user to enter a search query and submit the search query to the search engine server 206 to retrieve search results. For instance, the user device 202 may include a web browser that includes a search input box or allows a user to access a search page to submit a search query. Other mechanisms for submitting search queries to search engines are contemplated to be within the scope of embodiments of the present invention.

When the search engine server 206 receives a search query, the search engine index 210 is queried to identify search results. In some instances, a search result may have a corresponding action-based deeplink that has been identified by the action-based deeplink identification component 216. Accordingly, when the search engine server 206 returns the search result to the user device 202, the search result includes not only a hyperlink to the destination web page of the search result, but also an action-based deeplink that links to a location that allows the user to perform a corresponding action. In some embodiments, the search engine server 206 may return a search result that includes a hyperlink to the destination web page of the search result, one or more traditional deeplinks, and one or more action-based deeplinks based on information indexed for a web page corresponding with the search result.

Figure 3:
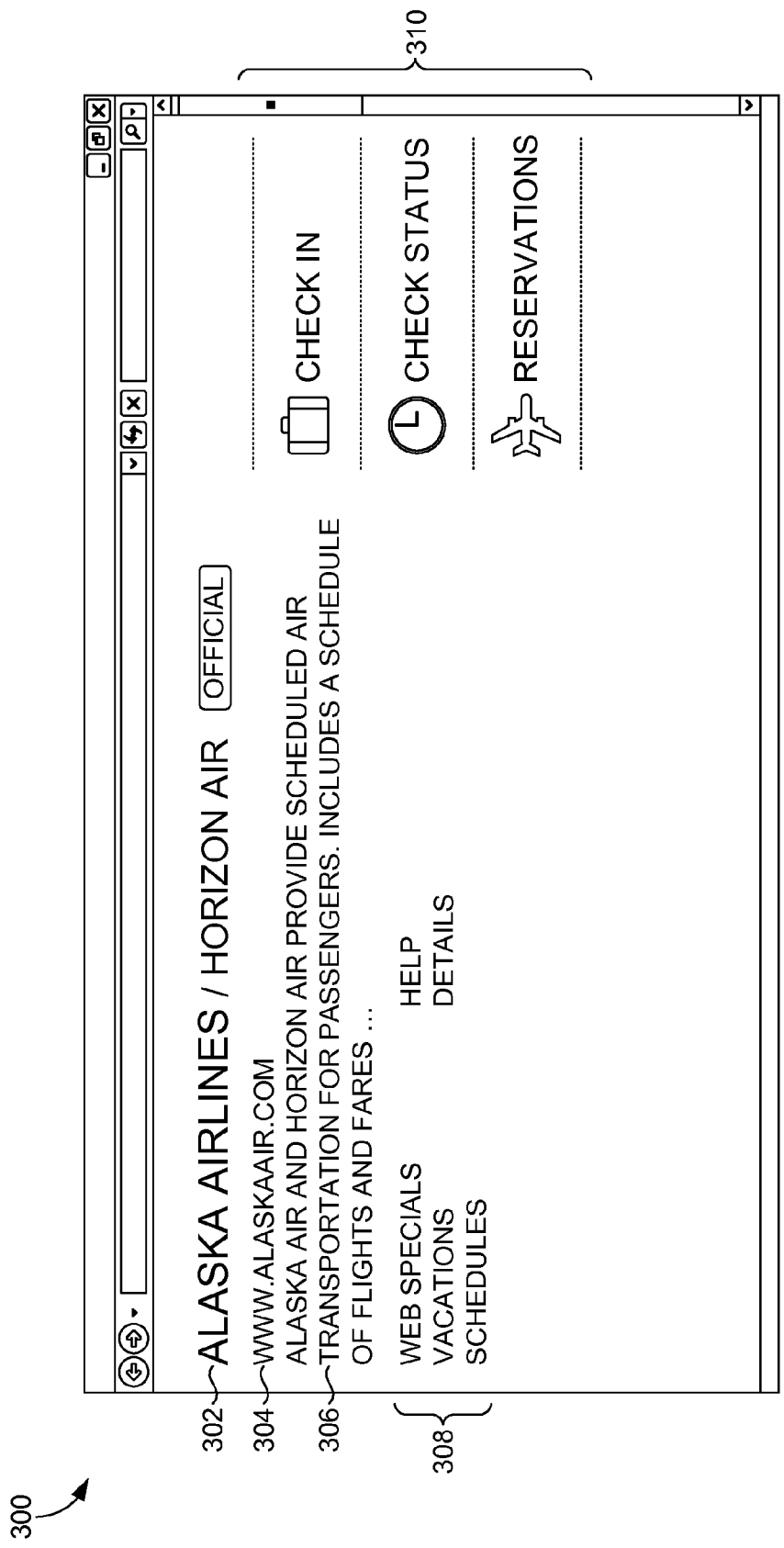
FIG. 3 is a screenshot providing an example of a search result with action-based deeplinks in accordance with an embodiment of the present invention.
Figure 4:
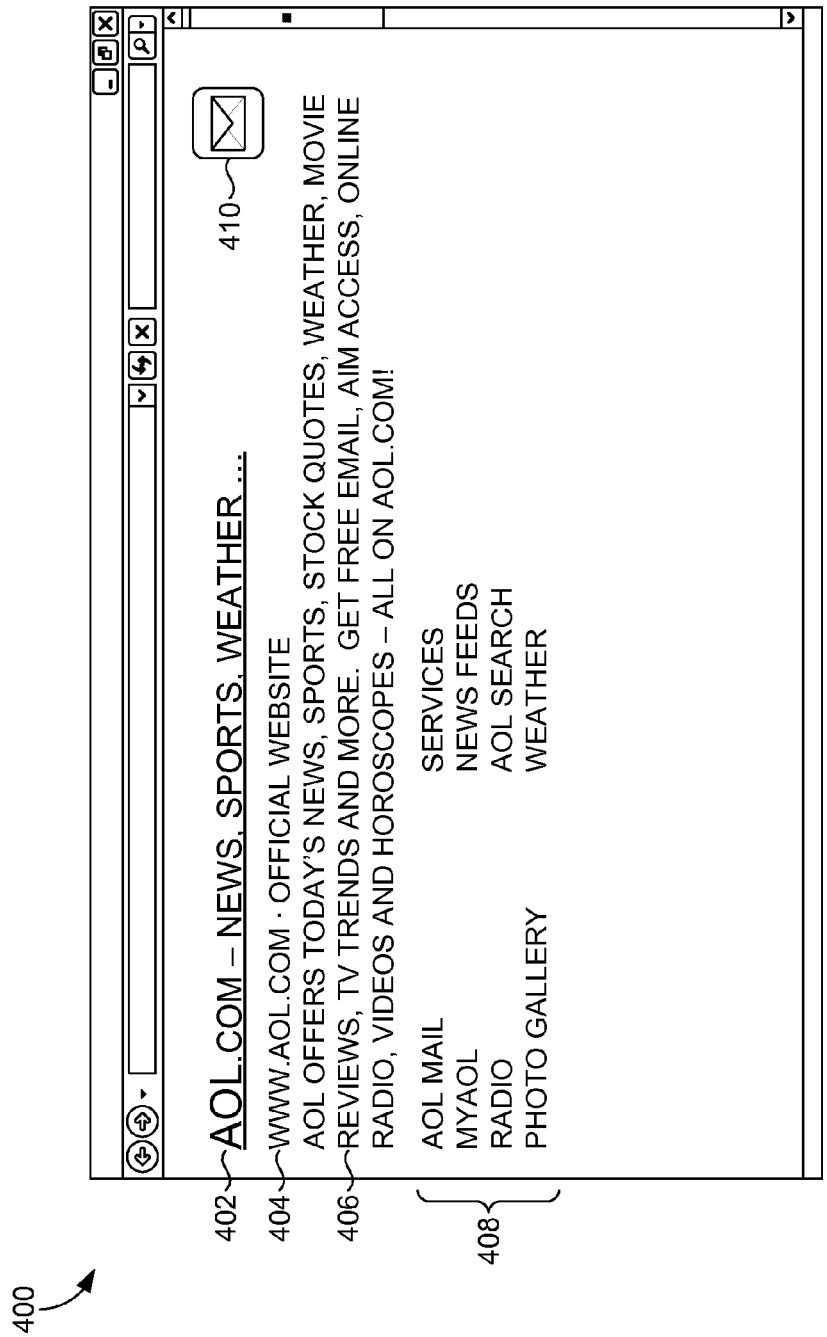
FIG. 4 is a screenshot providing another example of a search result with an action-based deeplink in accordance with an embodiment of the present invention.

Examples of search results that include action-based deeplinks are illustrated in the screen displays shown in FIGS. 3 and 4. It should be understood and appreciated by those of ordinary skill in the art that the screen displays of FIGS. 3 and 4 are provided by way of example only and are not intended to limit the scope of the present invention in any way.

Referring first to FIG. 3, a search result 300 is displayed that corresponds with the ALASKA AIRLINES web page. The search result 300 may be provided in response to a search query, such as "alaska airlines." As shown in FIG. 3, the search result 300 includes a title 302, the URL 304 of the destination web page for the search result, and a search result snippet 306 that provides a summary of the search result. The search result 300 also includes a number of deeplinks 308 and a number of action-based deeplinks 310, each of which link to a corresponding destination web page. As can be seen from FIG. 3, the search result 300 includes both deeplinks 308 and action-based deeplinks 310. The deeplinks 308 are specific to the particular web page (i.e., corresponding with www.alaskaair corn), while the action-based deeplinks 310 were identified by analyzing web pages within the airlines category, for instance using the system described above with reference to FIG. 2. Additionally, the deeplinks 308 and action-based deeplinks 310 are displayed differently. In particular, the action-based deeplinks 310 are shown more prominently, using an icon and larger text for each.

Turning next to FIG. 4, another example of a search result 400 is provided. The search result 400 includes a title 402, the URL 404 of the destination web page for the search result 400, and a search result snippet 406. The search result also includes a number of deeplinks 408 and an action-based deeplink 410. In the example of FIG. 4, only a single action-based deeplink 410 is provided. Additionally, the action-based deeplink 410 is presented using only an icon.

In some embodiments, the action-based deeplinks displayed for search results corresponding with each web page in a given category may be consistent across the search results. That is, action-based deeplinks may be provided for the same actions. Additionally, the action-based deeplinks may be presented in a similar manner using common anchor text and/or icons. Accordingly, while the deeplinks presented may vary from web page to web page, the action-based deeplinks may be similar or the same. For instance, when search results for other airlines' web pages are provided in response to search queries, the deeplinks may be different from the deeplinks 308 shown in FIG. 3. However, the action-based deeplinks provided for each search result may be similar to the action-based deeplinks 310 shown in FIG. 3. As noted above, by providing a consistent group of action-based deeplinks for web pages within a category, users may be provided a more consistent experience. As a result, users may be able to more quickly recognize the action-based deeplinks and access a location to perform a desired action.

Figure 5:
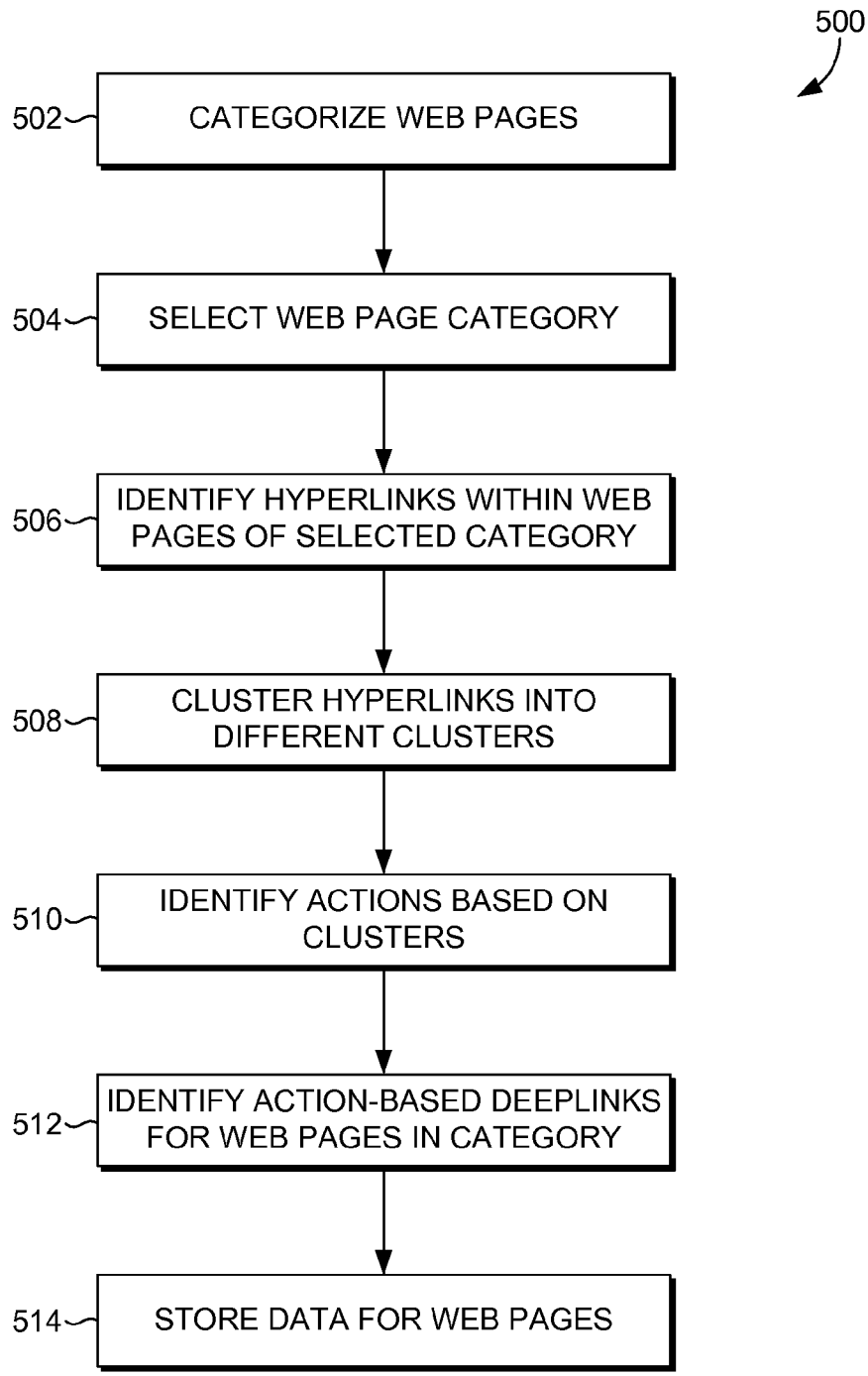
FIG. 5 is a flow diagram showing a method for identifying action-based deeplinks in accordance with an embodiment of the present invention.

With reference now to FIG. 5, a flow diagram is provided that illustrates a method 500 for identifying action-based deeplinks in accordance with an embodiment of the present invention. As shown at block 502, a number of web pages are categorized. Web page categorization may be accomplished in a variety of ways. In some embodiments, web pages may be automatically clustered into categories based on, for instance, the content of the web pages. In some embodiments, an editorial approach may be employed in which web pages may be manually categorized. In further embodiments, an existing web page categorization, such as ODP, may be employed.

As shown at block 504, a web page category is selected for analysis. Hyperlinks within the web pages within the selected category are identified, as shown at block 506. In some embodiments, all hyperlinks contained within those web pages may be identified for further processing. However, in other embodiments, only a subset of hyperlinks may be employed. For instance, some embodiments may identify hyperlinks to consider based on user click data representing user clicks on hyperlinks when users visit the web pages or user clicks on deeplinks in search results, the deeplinks corresponding with particular hyperlinks in the web pages.

The hyperlinks are clustered into a number of clusters, as shown at block 508. In various embodiments, the hyperlink clustering may be based on the anchor text of the hyperlinks, the content of the destination web pages corresponding with the hyperlinks, and/or other data. Common actions for the category of web pages are identified based on the hyperlink clusters, as shown at block 510. In particular, a cluster may be identified as corresponding with a particular action. In some instances, an action is identified for each cluster. In other embodiments, actions are only identified for clusters that meet a threshold, which may be based on, for instance, a total number of hyperlinks within a given cluster, click-through data for hyperlinks within a given cluster, or other data.

Action-based deeplinks are identified for each action for at least a portion of the web pages in the category, as shown at block 512. The action-based deeplinks correspond with hyperlinks in the web pages that link to locations corresponding with each action. Data is stored identifying the action-based deeplinks for web pages, as shown at block 514. This allows for the action-based deeplinks to be provided with search results for the web pages in response to search queries.

Figure 6:
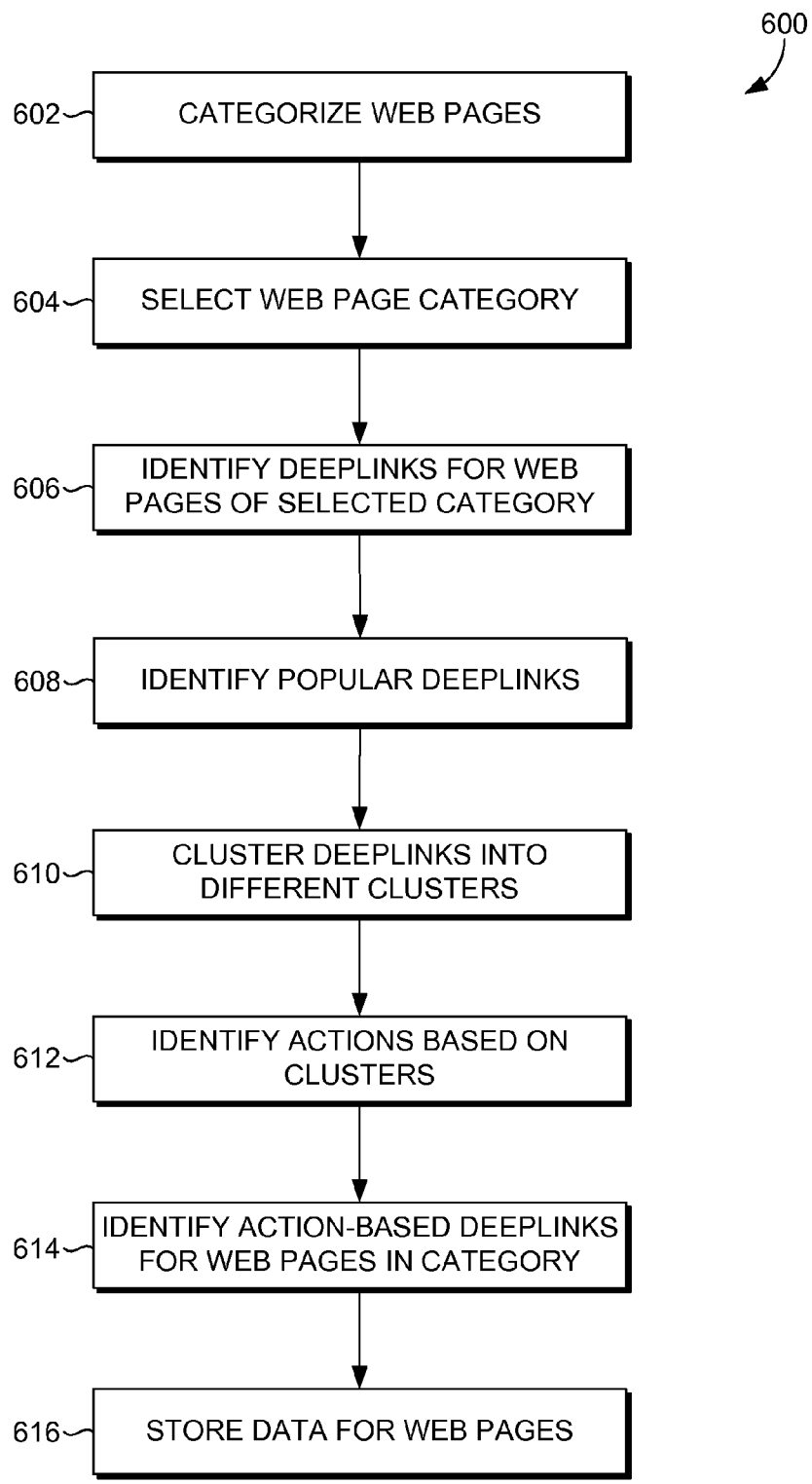
FIG. 6 is a flow diagram showing a method for identifying action-based deeplinks in accordance with another embodiment of the present invention.

As indicated previously, some embodiments may identify action-based deeplinks by analyzing deeplinks from web pages within a given web page category as opposed to analyzing all hyperlinks from those web pages. This specific approach is illustrated in the method 600 shown in FIG. 6. As shown at block 602, web pages are categorized, and a web page category is selected for analysis at block 604.

Deeplinks for web pages in the selected category are identified, as shown at block 606. These deeplinks correspond with hyperlinks that are provided in association with search results for the web pages when returning the web pages as search results in response to search queries. The deeplinks may have been previously identified for the web pages, for instance, by analyzing the hyperlinks in the web pages to identify important or popular hyperlinks (e.g., based on user clicks on the hyperlinks when users visit the web pages).

Popular deeplinks are identified at block 608. This may be performed by analyzing click-through data for the deeplinks. The click-through data may comprise information regarding user clicks on deeplinks when the deeplinks are provided with search results in response to search queries. By way of example only and not limitation, the click-through data for a deeplink may include information such as raw click data or click-through rates based on the number of clicks on the deeplink as compared to the number of times the deeplink is returned with search results.

The popular deeplinks are clustered into a number of clusters, as shown at block 610. The clustering may be based on, for instance, the anchor text of the deeplinks and/or the content of the destination web pages of the deeplinks. Actions are identified based on the clusters of deeplinks, as shown at block 612. In some instances, an action may be identified for each cluster. In other instances, only clusters that satisfy some threshold may be considered for identifying an action. The threshold may be based on, for instance, the number of deeplinks within a cluster or the popularity of the deeplinks in a cluster (e.g., based on click-through data).

For each identified action, hyperlinks within web pages within the selected category are identified as corresponding with the action, as shown at block 614. This may be done for a given action by identifying the deeplinks within the cluster corresponding with the action. In some embodiments, the hyperlinks may be automatically identified by analyzing the anchor text of hyperlinks or content of the destination web pages of the hyperlinks. This may include comparison of the anchor text or content of the destination web pages to the action or the cluster of deeplinks corresponding with the action (for instance, the anchor text or destination web pages for those deeplinks). In further embodiments, the hyperlinks may be manually identified by editors who review the web pages to identify hyperlinks corresponding with an action.

As shown at block 616, data is stored identifying the action-based deeplinks for web pages. This allows for the action-based deeplinks to be provided with search results for the web pages in response to search queries.

Figure 7:
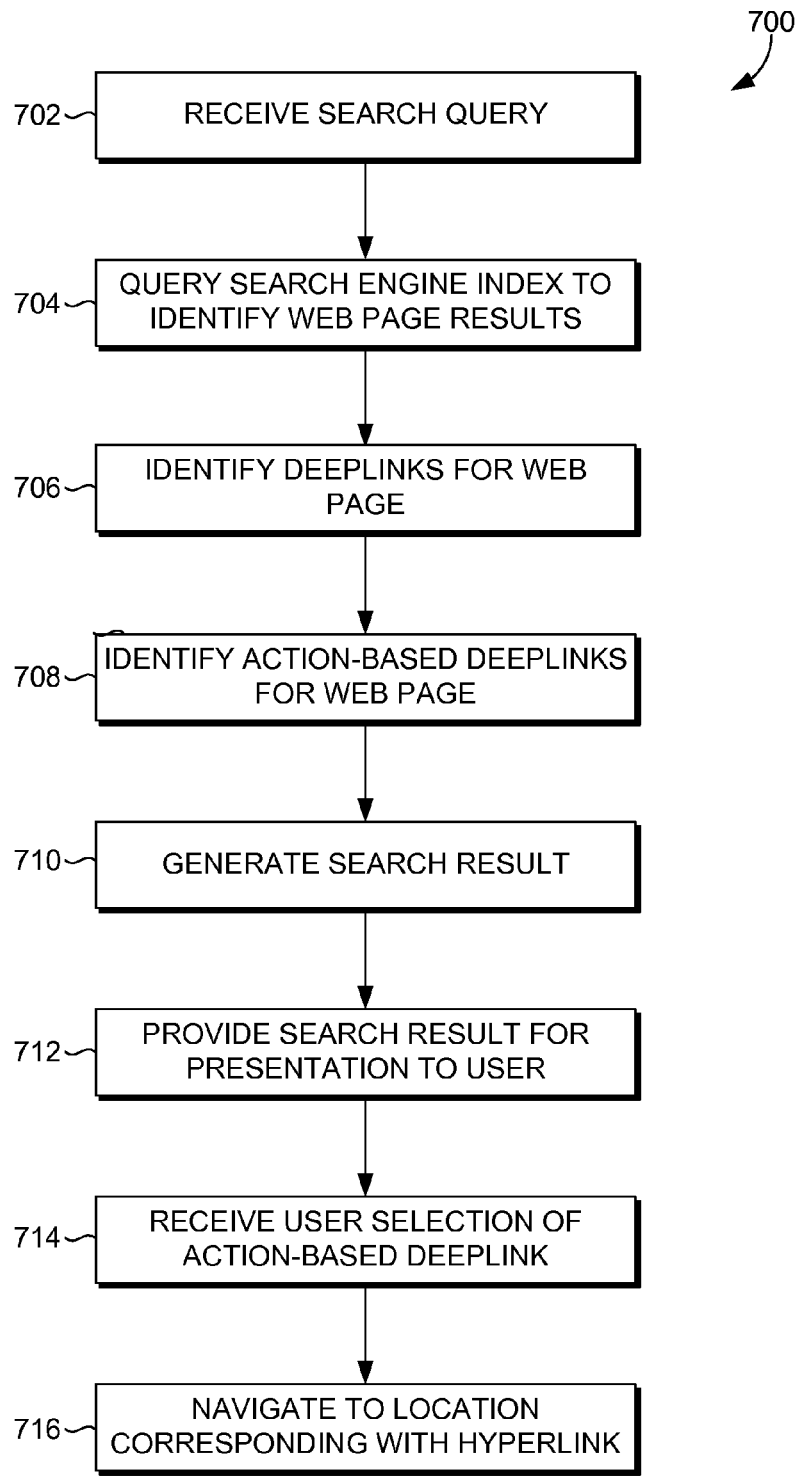
FIG. 7 is a flow diagram showing a method for returning a search result with an action-based deeplink in accordance with an embodiment of the present invention.

Turning now to FIG. 7, a flow diagram is provided that illustrates a method 700 for providing a search result that includes an action-based deeplink in response to a search query in accordance with an embodiment of the present invention. As shown at block 702, a search query is received from an end user. In response to the search query, a search engine index is searched to identify relevant web pages, as shown at block 704. Deeplinks are identified for one of the web pages, as shown at block 706. Action-based deeplinks are also identified for the web page, as shown at block 708. In particular, data may be stored for the web page, identifying deeplinks and action-based deeplinks for the web page. Accordingly, a search result is generated for the web page, as shown at block 710. The search result may include a hyperlink to the web page, the deeplinks, and the action-based deeplinks. The search result is provided to the end user device for presentation to the end user, as shown at block 712.

When the search result is presented, the search result may include a hyperlink to a destination web page corresponding with the search result. Additionally, the search result may include the deeplinks and the action-based deeplinks, which link to different web pages. In embodiments, the search result may include any number of deeplinks and action-based deeplinks. In some embodiments, the action-based deeplinks may be presented more prominently than the traditional deeplinks. The end user may select an action-based deeplink from the search result, as shown at block 714. In response to the user selection, the end user is navigated to the destination web page corresponding with the selected action-based deeplink, as shown at block 716.

Parameterized Action Links with Contextual Pre-Population of Parameter Values

The common actions that are identified for a category of websites and exposed in search results may be parameterized actions. In particular, a parameterized action is an action for which an end user may specify parameter values. By way of example to illustrate, real estate websites may commonly allow users to search for houses by specifying certain criteria. For instance, a user may search for houses at these websites by specifying parameters such as location, number of bedrooms, number of bathrooms, minimum price, maximum price, and other criteria. As such, a "find house" action may be identified as a parameterized action for these real estate websites. The parameters associated with the "find house" action may include any of the criteria that a user may specify (e.g., location, number of bedrooms, number of bathrooms, etc.).

Accordingly, some embodiments of the present invention identify a parameterized action common to websites of a particular category, as well as the most common parameters for the parameterized action. When a user submits a search query to a search engine that returns a web page from a website having a parameterized action, the parameterized action may be provided as part of the search result returned to the end user. The parameterized action may identify parameters associated with the action and include input boxes or other UI elements that allow a user to enter or otherwise specify values for the parameters.

Figure 8A:
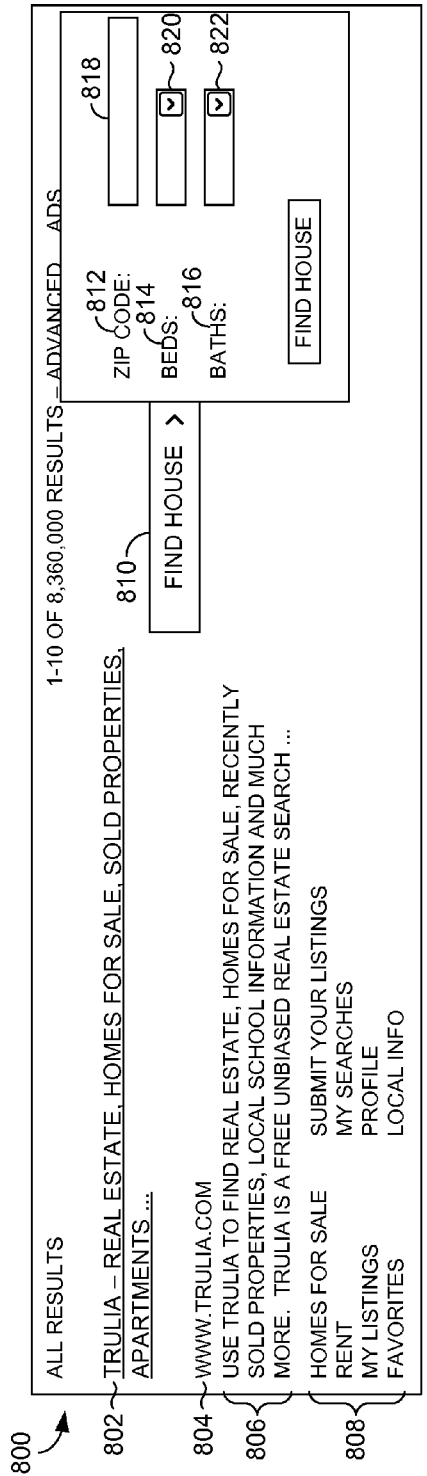
FIGS. 8A and 8B are screenshots providing an example of a search result with a parameterized action allowing a user to enter parameter value in accordance with an embodiment of the present invention.

By way of illustration, FIG. 8A shows a search result 800 that corresponds with the web page, www.trulia.com, which is a real estate website. The search result 800 may be returned, for instance, in response to a search query, such as "trulia." As shown in FIG. 8, the search result 800 includes a title 802, the URL 804 of the destination web page for the search result, and a search result snippet 806 that provides a summary of the search result. The search result 800 also includes a number of deeplinks 808 and a button 810 for a parameterized action.

The parameterized action associated with the button 810 is a "find house" action that allows a user to search for houses that meet the user's criteria. The parameters exposed for the action include zip code 812, number of bedrooms 814, and number of bathrooms 816. Input boxes 818, 820, 822 are associated with the parameters 812, 814, 816 to allow a user to specify values for the parameters 812, 814, 816. The parameters 812, 814, 816 and associated input boxes 818, 820, 822 may be initially displayed as part of the search result or may be displayed when a user hovers over or otherwise interacts with the button 810.

As represented in FIG. 8A, input boxes may be free-form to allow a user to enter any value or may be drop-down boxes that allow a user to select from one of a number of predetermined values. It should be understood that the parameter values that may be specified by a user for different parameters may be numerical values, text, or otherwise.

Figure 8B:
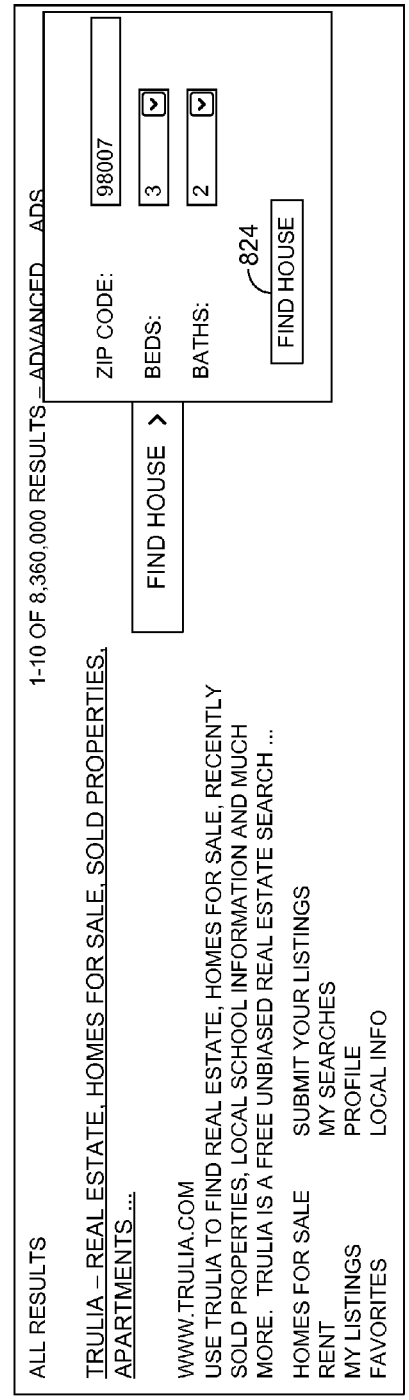

As shown in FIG. 8A, the input boxes 818, 820, 822 associated with the parameters 812, 814, 816 for the "find house" action may initially be blank. A user may then enter parameter values in the input boxes 818, 820, 822, for instance, as shown in FIG. 8B. For example, the user has entered "98007" for the zip code, "3" for the number of bedrooms, and "2" for the number of bathrooms in the screenshot of FIG. 8B. After the user enters the parameter values and selects the button 824, a URL is generated using the parameter values, and the user is navigated to a web page within the www.trulia.com website that includes houses that meet the user's criteria.

Figure 9:
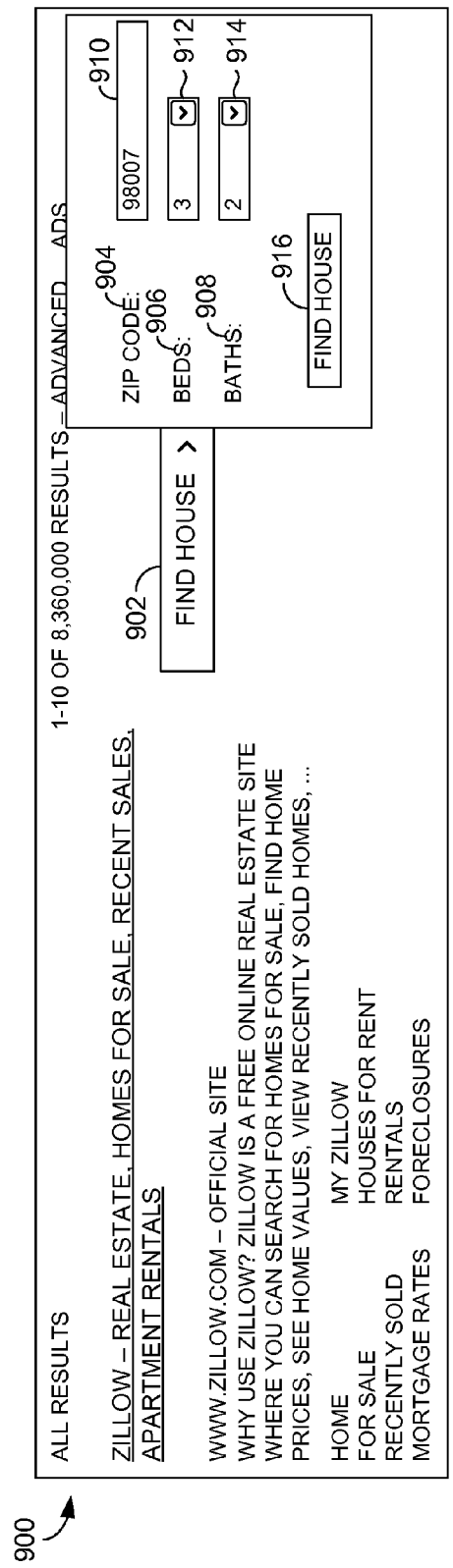
FIG. 9 is a screenshot providing an example of a search result with pre-populated parameter values in accordance with an embodiment of the present invention.

The parameter values entered by a user for a particular parameterized action may be stored and used to pre-populate parameters for subsequent search results having the same parameterized action. For instance, the parameter values entered for zip code, number of bedrooms, and number of bathrooms in FIG. 8B would be saved in conjunction with an identifier for the corresponding parameter. As such, with reference to FIG. 9, suppose the user performs a subsequent search that returns another real estate website as a search result 900. As shown in FIG. 9, the search result includes a button 902 for the "find house" action and the corresponding parameters zip code 904, number of bedrooms 906, and number of bathrooms 908. Additionally, the input boxes 910, 912, 914 associated with the parameters 904, 906, 908 have been pre-populated with the parameter values entered in the previous search result in FIG. 8B. As such, this saves the user time as the user can simply select the button 916 to find houses at the www.zillow.com website that satisfy the user's criteria without requiring the user to again enter the parameter values.

In some instances, if the user has not already specified parameter values for certain parameters, the system may attempt to automatically identify information that may be used to pre-populate parameter values in search results. For instance, in the example of a "find house" action for real estate websites, suppose the user has not yet entered any values when a web page corresponding with a real estate website is identified as a search result to the user's search query. The system may automatically identify the location of the user (e.g., based on user profile information available for the user, by automatically identifying a location based on the user's IP address, or otherwise automatically identifying the location), and that location may be used to pre-populate the zip code parameter.

Figure 10:
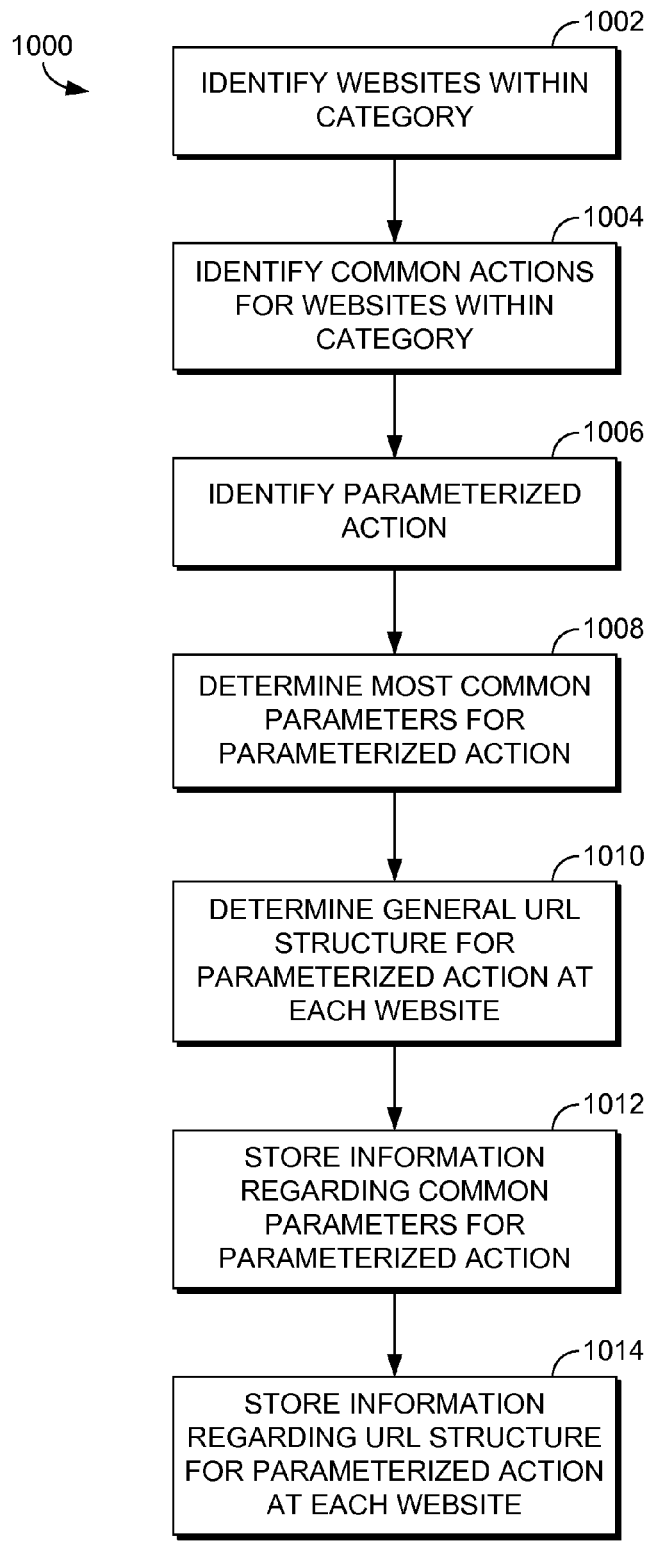
FIG. 10 is a flow diagram showing a method for identifying parameters for a parameterized action common to websites within a given category in accordance with an embodiment of the present invention.

Turning now to FIG. 10, a flow diagram is provided that illustrates a method 1000 for identifying a parameterized action common to websites within a given category and a set of common parameters for the parameterized action. As shown at block 1002, websites within a particular category are identified. Websites may be categorized in a variety of different manners as described hereinabove. In some instances, websites may be automatically clustered into categories based on, for instance, the content of the web pages within the web site. In some embodiments, an editorial approach may be employed in which web sites may be manually categorized. In further embodiments, an existing website categorization, such as ODP, may be employed.

As shown at block 1004, common actions performed at the websites within a given category are identified. The common actions may be identified in a variety of different manners. By way of example only and not limitation, the common actions may be identified using the method 500 discussed above with reference to FIG. 5 and/or the method 600 discussed above with reference to FIG. 6.

One of the common actions is identified as a parameterized action, as shown at block 1006. In particular, the action is identified as having a number of parameters for which users may specify values for performing the action at the websites. Additionally, the most common parameters for the parameterized action at the websites are determined as shown at block 1008. For instance, if real estate websites are being analyzed, a parameterized action that may be identified may be a "find house" action that allows users to search for houses that meet the users' criteria. The parameters that may be associated with the "find house" action may include the various criteria users may specify, such as location, number of bedrooms, number of bathrooms, minimum price, and maximum price.

The parameterized action and common parameters for the parameterized action may be identified using a number of different approaches. For instance, the parameterized action and associated parameters may be identified by manual inspection of the common actions available at the websites. Alternatively, the parameterized action and associated parameters may be identified using a algorithmic approach, such as will be described below with reference to FIG. 11.

A general URL structure for the parameterized action is determined for each website having the parameterized action, as shown at block 1010. In particular, the general URL structure for a parameterized action at a given website comprises a template form of the URL that may be used with parameter values specified by an end user to generate a URL that will navigate to a particular web page corresponding with the parameterized action and the parameter values specified by the end user, as will be described in further detail below. For instance, the general form of a URL at a real estate website may be: www.realestatesiteexample.com/gethouse?beds={BEDS}&baths={BATHS}&zip={ZIP}. When a user specifies parameter values, the general URL structure may be used to generate a URL for use. For instance, if the user were to specify three bedrooms, two baths, and the zip code 98007, the following URL may be generated: www.realestatesiteexample.com/gethouse?beds=3&baths=2&zip=98007.

As shown at block 1012, information regarding the common parameters for the parameterized action is stored. As such, this information may be used during runtime, when a search query is issued to a search engine, to provide the parameterized action with the parameters as part of a search result returned by the search engine, as will be described in further detail below. Additionally, information regarding the general URL structure for the parameterized action for each of the websites is stored, as shown at block 1014. This information may be used during runtime to generate an appropriate URL given values entered by a user for parameters exposed for the parameterized action as part of a search result, as will be described in further detail below.

Figure 11:
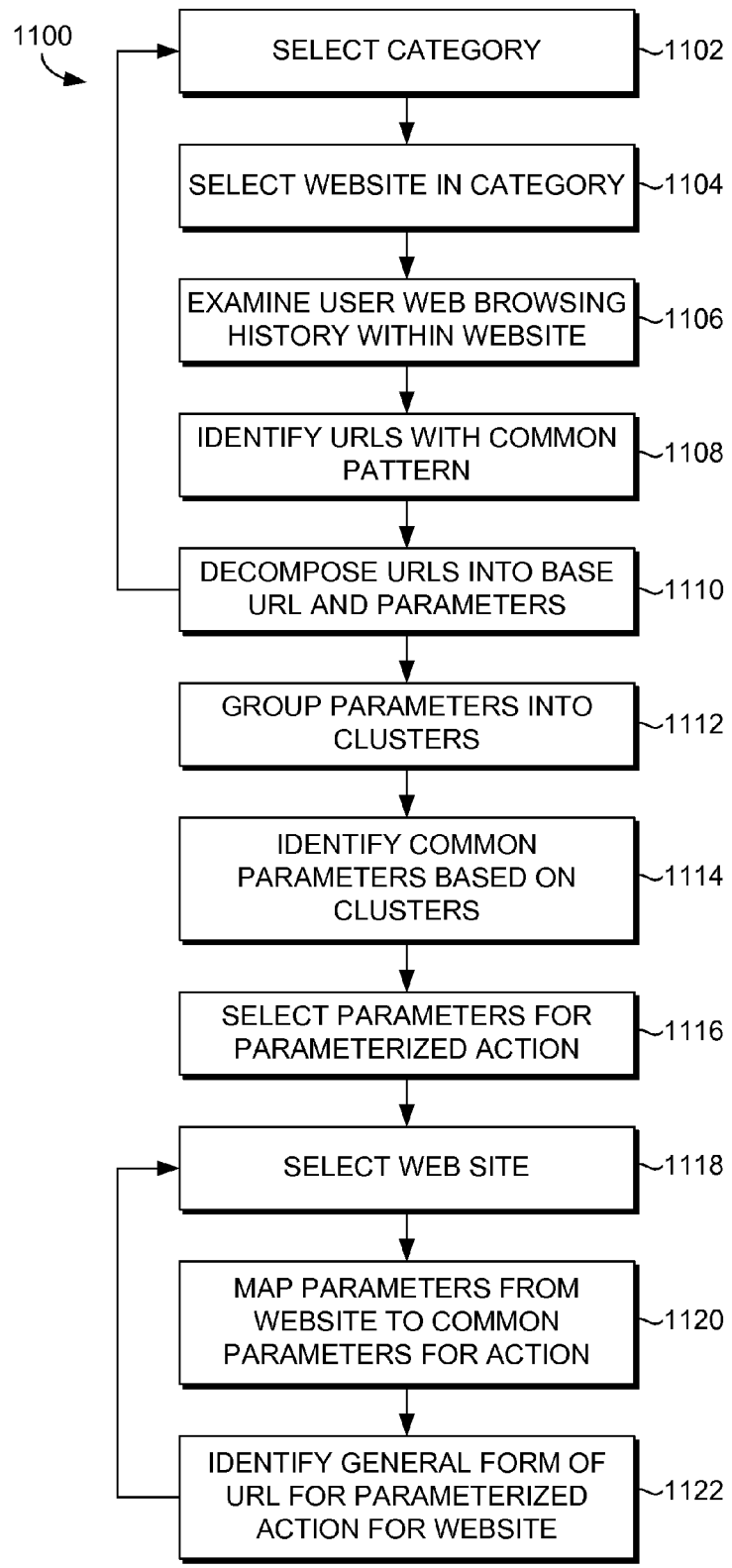
FIG. 11 is a flow diagram showing a method for identifying a parameterized action and parameters for that action in accordance with an embodiment of the present invention.

One method 1100 for identifying a parameterized action and parameters for that action is illustrated with reference to FIG. 11. As discussed previously, processes may initially be performed to group websites into particular categories. As shown at block 1102, a category to analyze is selected, and a website in the category being analyzed is selected at block 1104. Information regarding user browsing history within the selected website is examined, as shown at block 1106. The information may include web pages users have visited within the website, with each web page being identified with a specific URL for the web page.

URLs within the user browsing history information that have a common pattern are identified from the analysis, as shown at block 1108. The URLs may be determined to correspond with a particular action within the website. For instance, in the context of a real estate category being analyzed, a real estate website within that category may include a webpage that provides a house search action that allows users to enter various information (e.g., number of bedrooms, number of bathrooms, zip, etc.) to search for houses that meet the users' criteria. The process may identify URLs navigated to by users from that web page and the particular pattern of that URL. In the present example, those URLs would be the result pages that include the house search results corresponding with the users' parameters. For instance, the URL www.realestatesiteexample.com/gethouse?beds=3&baths=2&zip=98007 may correspond with a web page that provided houses that met a user's criteria of three bedrooms, two bathrooms, and the zip code 98007.

The URLs are decomposed into a base URL and various parameters, as shown at block 1110. By way of illustration continuing the example above of a real estate website, a URL such as www.realestatesiteexample.com/gethouse?beds=3&baths=2&zip=98007, may be decomposed to the base URL www.realestatesiteexample.com/gethouse and the parameters: bed, bath, and zip.

The process of analyzing websites from blocks 1104 through 1110 may be performed for a number websites within the selected category. As such, parameters for a particular action from each of the websites may be identified. The parameters from the various websites for the action are grouped into clusters, as shown at block 1112. The parameters may be clustered using any of a number of different approaches. By way of example only and not limitation, the parameters may be clustered by analyzing the edit distance of the parameter names. As another example, parameters may be clustered by examining the values assumed by the parameters at each of the websites. The clustering may be done manually and/or algorithmically.

Common parameters for the action are identified based on the clusters, as shown at block 1114. A number of these common parameters may be selected at block 1116 as the parameters to be exposed for the parameterized action when the parameterized action is provided as part of a search result. In some instances, all common parameters may be exposed in search results, while in other instances, only a subset of the common parameters may be exposed. A subset may be selected based on factors, such as how often each parameter was used in the web browsing history or how recent each parameter was used in the web browsing history.

As shown at block 1118, a website is selected for further analysis. In particular, the parameters from the website are mapped to the common parameters selected at block 1116, as shown at block 1120. For instance, the parameters at the website may be mapped to a parameter key for each selected parameter. In some instance in which a parameter has a small, finite number of values seen in the web browsing history information, (e.g., bedrooms having a value of 1, 2, 3, 4, or 5+), the possible key values may be marked. Otherwise, the parameter may be marked as free-form.

The general form of the URL for the parameterized action at the selected website is determined at block 1122. The general form of the URL is based on the pattern seen from URLs in the web browsing history information for the website and the common parameters selected at block 1116. For instance, the general form for the fictitious website www.realestatesiteexample.com may be: www.realestatesiteexample.com/gethouse?beds={BEDS}&baths={BATHS}&zip={ZIP}. This general URL form includes the insertion points {BEDS}, {BATHS} and {ZIP} that allows for the inclusion of parameter values specified by a user to generate a useable URL as will be described in further detail below.

The process of mapping parameters from a website to the selected parameters for the parameterized action and generating a general URL structure for parameterized action at the website is performed for each of the websites within the particular category. As such, a general URL form may be provided for each of the web sites for use during runtime when web pages from the websites are returned as search results to user search queries.

Figure 12:
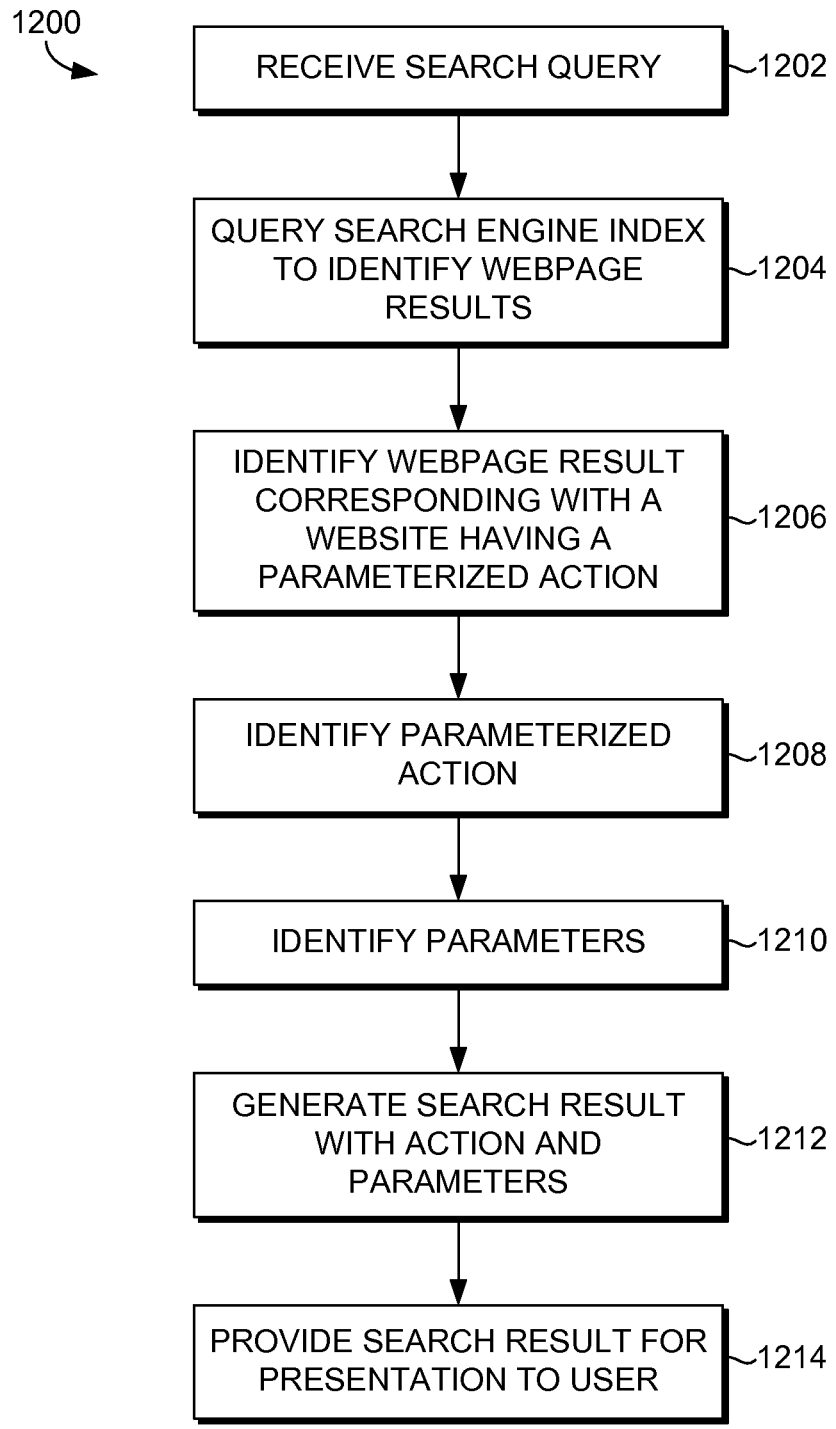
FIG. 12 is a flow diagram showing a method for returning providing a parameterized action as part of a search result in accordance with an embodiment of the present invention.

With reference now to FIG. 12, a flow diagram is provided that illustrates a method 1200 for providing a parameterized action as part of a search result. As shown at block 1202, a search query is received from an end user. In response to the search query, a search engine index is searched to identify relevant web pages, as shown at block 1204.

A web page result for the query is identified as corresponding with a website having a parameterized action, as shown at block 1206. In particular, metadata may be stored (e.g., using the method 1000 of FIG. 10 and/or the method 1100 of FIG. 11 described hereinabove) for the web page regarding the parameterized action and the parameters for the parameterized action. As such, when the web page is identified as a result for the query, the metadata may indicate that a parameterized action is available for the web page. Accordingly, the parameterized action is identified at block 1208 and the corresponding parameters are identified at block 1210 based on the metadata stored for the web page.

A web page search result is generated to include the parameterized action, including an indication of the parameters and UI elements that allow an end user to enter values for each parameter, as shown at block 1212. The search result is provided for presentation to the end user, as shown at block 1214.

In some instances, a parameterized action may be provided only for a top search result. In other instances, a parameterized action may be provided with any search result returned in response to the search query.

By way of example to illustrate, suppose the user enters a search query that returns a web page from a real estate website. The search result may include a "find house" parameterized action that allows a user to search for houses at the website. The parameterized action may include the following parameters: zip code, number of bedrooms, and number of bathrooms.

Figure 13:
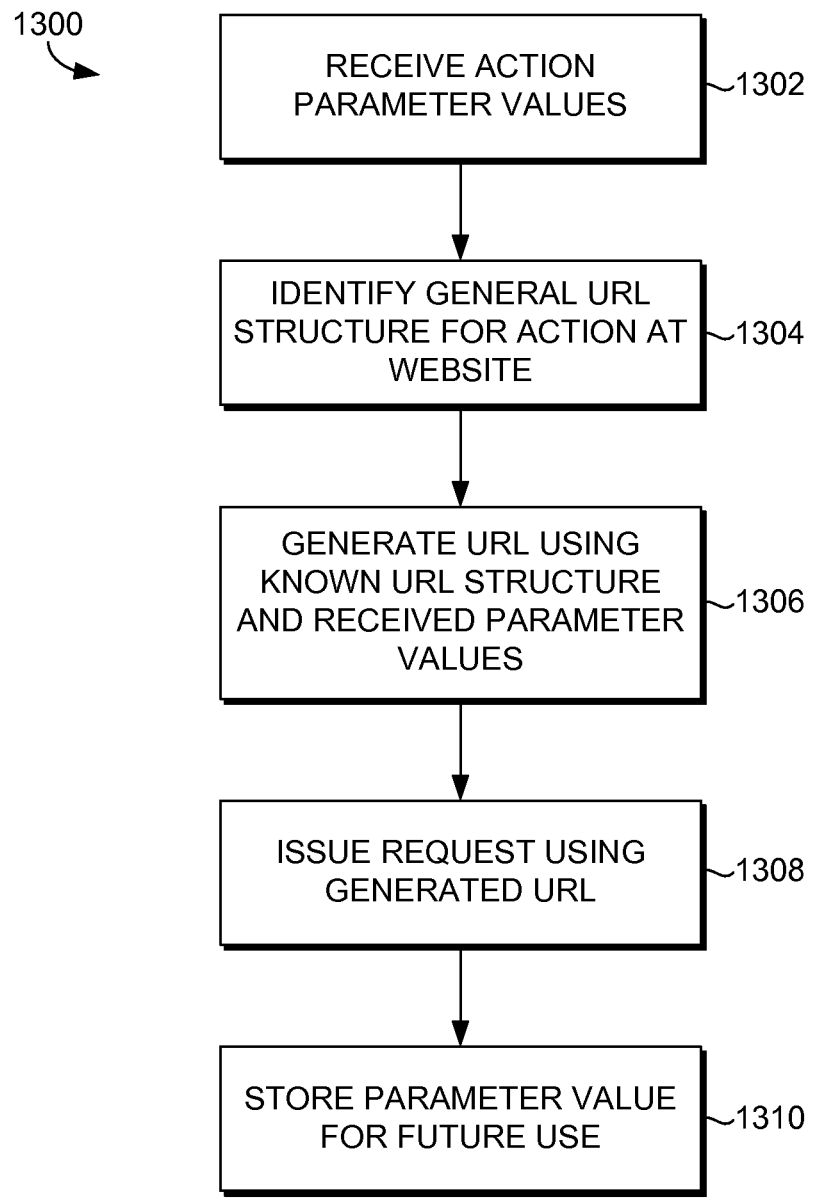
FIG. 13 is a flow diagram showing a method for processing parameter values entered by a user in accordance with an embodiment of the present invention.

When the search result is presented to the end user, the search result may include an indication of the parameterized action and the various parameters for which the user may specify values. The user may then enter values in UI elements (e.g., input boxes) provided as part of the search result. FIG. 13 illustrates a flowchart showing a method 1300 for processing parameter values entered by a user. This process may be performed locally on an end user device and/or by a component of the search engine service that provided the search results to the end user.

As shown at block 1302, parameter values entered by the end user are received. For instance, if the website is a real estate website, the parameters may include zip code, number of bedrooms, and number of bathrooms, and the user may enter the zip code 98007, 3 bedrooms, and 2 bathrooms.

The general URL structure for the parameterized action at the web site is identified at block 1304. As described hereinabove, with reference to FIG. 11, the general URL structure for the action at this particular web site may have been previously determined by examining the patterns of URLs from user browsing history information for the website. For instance, the general URL structure for the fictitious website www.realestatesiteexample.com may be www.realestatesiteexample.com/gethouse?beds={BEDS}&baths={BATHS}&zip={ZIP}.

Using the received parameter values and the general URL structure for the action at the website, a URL is generated, as shown at block 1306. Continuing the example above, based on the user entering the zip code 98007, 3 bedrooms, and 2 bathrooms and based on the above general URL form, the following URL may be generated: www.realestatesiteexample.com/gethouse?beds=3&baths=2&zip=98007. As such, the insertion points in the general URL form (e.g., {BEDS}, {BATHS} and {ZIP}) have been replaced with the parameter values specified by the end user to generate the URL.

A request is issued using the generated URL, as shown at block 1308. As such, the user is navigated directly from the search result at which the user entered the parameter values to a corresponding web page based on the generated URL. In the above example, a web page would be provided by the real estate website with houses that meet the user's criteria.

The parameter values entered by the user in the search result are also stored for future use, as shown at block 1310. For instance, from the above example, the parameter values stored would include: 98007 for zip code, 3 for the number of bedrooms, and 2 for the number of bathrooms.

The parameter values entered by the user may be stored, for instance, as name-value pairs. Each name-value pair may include a parameter name (e.g., zip code) and a corresponding value that was entered by the user (e.g., 98007). The parameter values may be stored, for instance, locally on the end user device and/or at a component of the search engine service that provided the search results to the end user.

Figure 14:
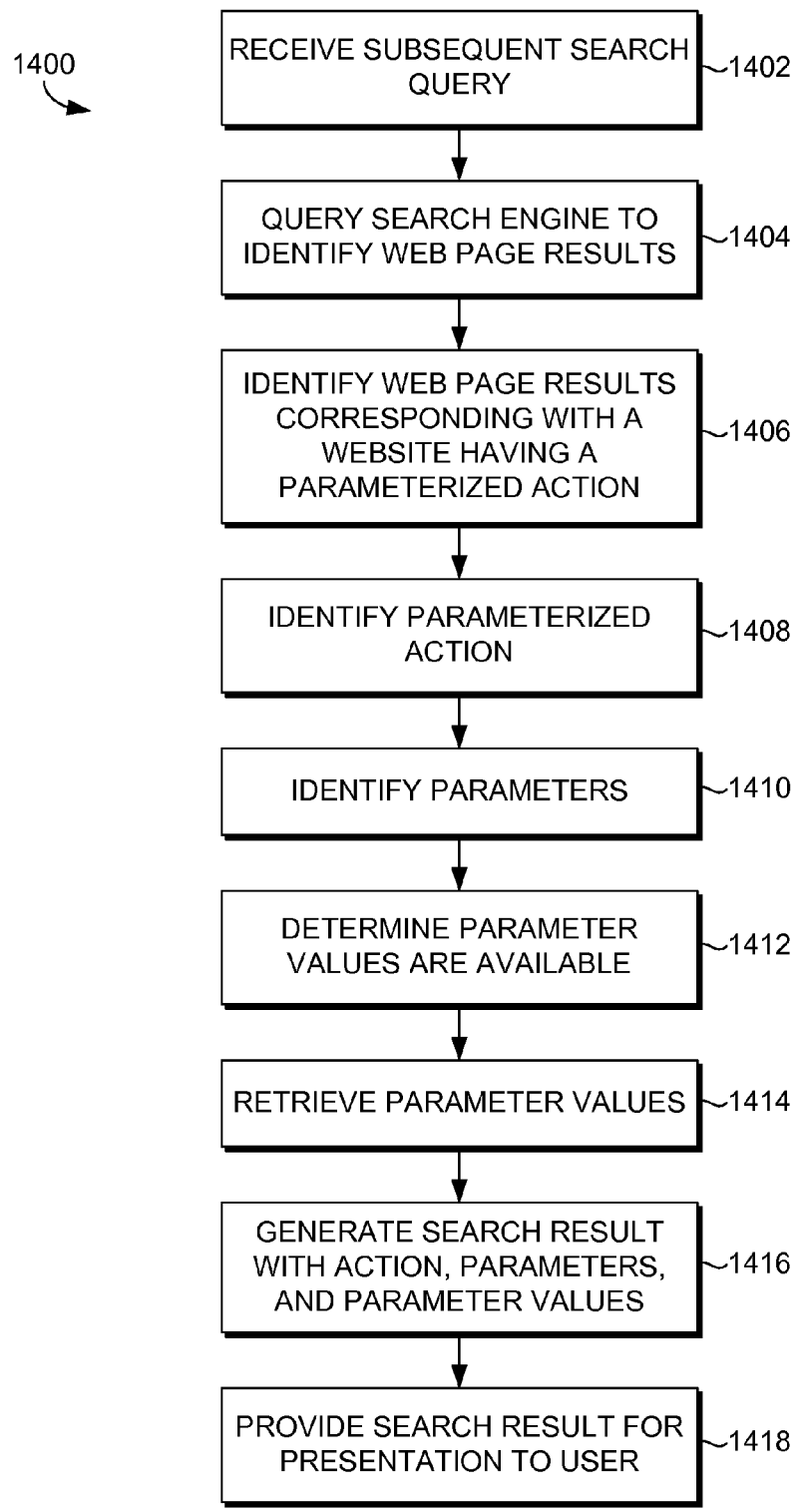
FIG. 14 is a flow diagram showing a method for using stored parameter values to pre-populate parameters exposed in search results from the same category returned in response to subsequent searches submitted by the end user in accordance with an embodiment of the present invention.

Parameter values entered by the user and stored (e.g., at step 1310 of FIG. 13) may be used to pre-populate parameters exposed in search results from the same category returned in response to subsequent searches submitted by the end user. FIG. 14 provides a flow diagram that illustrates a method 1400 for using stored parameter values in this manner. Referring initially to block 1402, a subsequent search query is received from the end user. In response to the search query, a search engine index is searched to identify relevant web pages, as shown at block 1404.

A web page result for the query is identified as corresponding with a website having a parameterized action, as shown at block 1406. As discussed previously, metadata may be stored for the web page regarding the parameterized action and the parameters for the parameterized action. As such, when the web page is identified as a result for the query, the metadata may indicate that a parameterized action is available for the web page. Accordingly, the parameterized action is identified at block 1408 and the corresponding parameters are identified at block 1410 based on the metadata stored for the web page.

A determination is made at block 1412 that parameter values are available for the end user for the parameters of this parameterized action. In particular, the parameter values may have been received from the end user and stored in conjunction with a previous search by the end user (e.g., using the method 1300 of FIG. 13).

The parameter values are retrieved, as shown at block 1414. A web page search result is generated to include the parameterized action, including an indication of the parameters for the action, as shown at block 1416. Additionally, UI elements that allow for entry of parameter values for the parameters may be pre-filled with the retrieved parameter values. The search result is provided for presentation to the end user, as shown at block 1418.

By way of example to illustrate, suppose that the user who specified the zip code 98007, three bedrooms, and two bathrooms in the example discussed with reference to FIG. 13 submitted a subsequent search that returned a web page result that corresponds with another real estate website. As such, the new search result also includes a "find house" action with the parameters: zip code, number of bedrooms, and number of bathrooms. Based on the user entering the zip code 98007, three bedrooms, and two bathrooms in the previous search result and those parameter values being stored, those parameters values may retrieved and used to pre-populate the UI elements for the same parameters exposed for the parameterized action provided as part of the new search result. The user may then simply select to perform the action at the new website without having to again enter the same parameter values. However, the UI elements may be configured to allow the user to modify the parameter values if desired. If different parameter values are entered by the user, those parameter values may be stored for the parameters for future use in subsequent searches.

Figure 15:
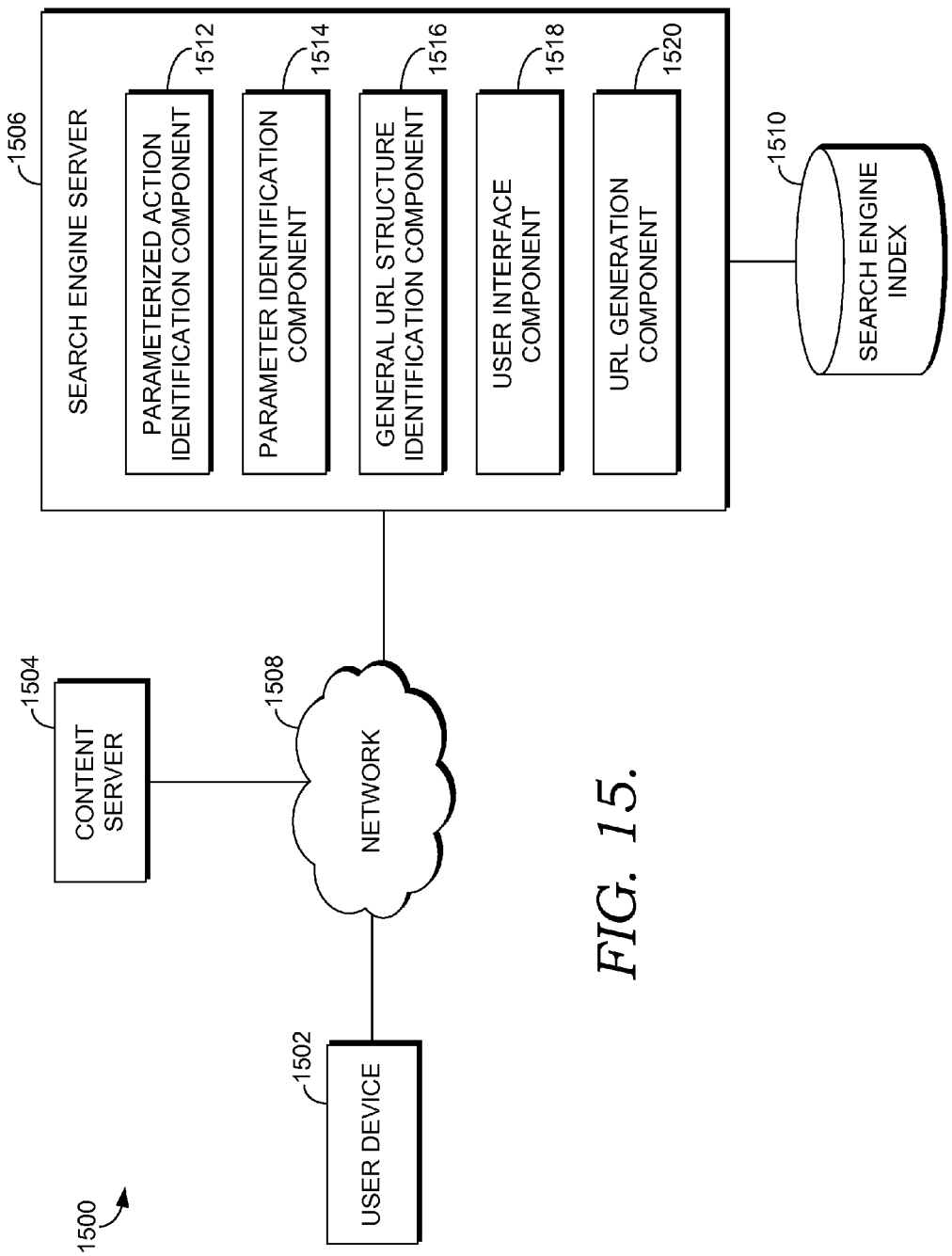
FIG. 15 is a block diagram of an exemplary system in which embodiments of the invention may be employed.

Referring next to FIG. 15, a block diagram is provided illustrating an exemplary system 1500 in which some embodiments of the present invention may be employed. It should be understood that this arrangement is set forth only as an example. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 1500 may include a user device 1502, content server 1504, and search engine server 1506. Each of the components shown in FIG. 15 may be any type of computing device, such as computing device 100 described with reference to FIG. 1, for example. The components may communicate with each other via a network 1508, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 1500 within the scope of the present invention. Each may comprise a single device or multiple devices cooperating in a distributed environment. For instance, the search engine server 1506 may comprise multiple devices arranged in a distributed environment that collectively provide the functionality of the search engine server 1506 described herein. Additionally, other components not shown may also be included within the system 1500.

The search engine server 1506 generally operates to index information regarding web pages served by content servers, such as the content server 1504, in a search engine index 1510. When the search engine server 1506 receives search queries from user devices, such as the user device 1502, the search engine queries the search engine index 1510 to identify search results based on the users' search queries and returns those search results to the user devices. In accordance with some embodiments of the present invention, the search engine server 1506 is also configured to identify parameterized actions for some web sites and to provide those parameterized actions and UI elements to allow end users to specify parameter values for the actions when providing search results corresponding with those web sites.

In the embodiment shown in FIG. 15, the search engine server 1506 includes, among other things, a parameterized action identification component 1512, a parameter identification component 1514, a general URL structure identification component 1516, a user interface component 1518, and a URL generation component 1520. Although not shown in FIG. 15, the search engine server 1506 may include components from the search engine server 206 described above with reference to FIG. 2, for instance, to categorize websites and identify actions common to websites within given categories.

The parameterized action identification component 1512 operates to identify parameterized actions common to websites within particular categories. The parameter identification component 1514 operates to identify common parameters for each parameterized action identified by the parameterized action identification component 1512. Additionally, the general URL structure identification component 1516 operates to identify a general URL structure for parameterized actions at websites. The parameterized action identification component 1512, parameter identification component 1514, and general URL structure identification component 1516 may operate to identify the parameterized actions, identify common parameters for parameterized actions, and determine the general URL structure for the parameterized actions, for instance, using approaches such as those described above with reference to FIGS. 10 and 11.

The user interface component 1518 provides an interface to user devices, such as the user device 1502, that may allow end users to submit search queries to the search engine server 1506 and to receive search results from the search engine server 1506. It should be understood that the user device 1502 may be any type of computing device employed by a user to submit search queries and receive search results. By way of example only and not limitation, the user device 1502 may be a desktop computer, a laptop computer, a tablet computer, a mobile device, or other type of computing device. The user device 1502 may include an application that allows a user to enter a search query and submit the search query to the search engine server 1506 to retrieve search results. For instance, the user device 1502 may include a web browser that includes a search input box or allows a user to access a search page to submit a search query. Other mechanisms for submitting search queries to search engines are contemplated to be within the scope of embodiments of the present invention.

When the search engine server 1506 receives a search query, the search engine index 1510 is queried to identify search results. In some instances, a search result may have a corresponding parameterized action that has been identified by the parameterized action identification component 1512 with corresponding parameters identified by the parameter identification component 1514. Accordingly, when the search engine server 1506 returns the search result to the user device 1502, the search result includes not only a hyperlink to the destination web page of the search result, but also a parameterized action available at the website corresponding with the web page. The parameterized action included with the search result may identify the parameters available for the parameterized action and include UI elements that allow the user to specify parameter values for those parameters.

The search engine server 1506 also includes a URL generation component 1520. In particular, when a user receives a search result that includes a parameterized action and enters parameter values, the parameter values may be communicated to the search engine server 1506. The URL generation component 1520 may identify a general URL structure for the parameterized action at the website corresponding with the search result and use the general URL structure with the parameter values entered by the user to generate a URL that will provide the parameterized action at the website based on the parameter values.

When the search engine server 1506 receives parameter values from the user, the search engine server 1506 may store the parameter values for future use. Accordingly, when the user issues a subsequent query that returns a web page corresponding with a website from the same category and having the same parameterized action, the search engine server 1506 may identify the stored parameter values previously entered by the user. Accordingly, the search engine server 1506 prepares a search result that includes an indication of the parameterized action and corresponding parameters and uses the stored parameter values to pre-populate the UI elements for the parameters.

Although not shown in FIG. 15, it should be understood that some components provided on the search engine server 1506 may be provided on the user device 1502 such that the operations of those components may be performed on the user device 1502 or the operations may be performed in part by the search engine server 1506 and in part by the user device 1502. For instance, URL generation using a general URL structure for a parameterized action and entered parameter values may be performed on the user device 1502. As another example, parameter values may be stored on the user device 1502 such that when the user device 1502 receives a subsequent search result with the parameterized action, the UI elements for the parameters may be pre-populated with the stored parameter values on the user device 1502. Any and all such combinations and variations thereof are contemplated to be within the scope of embodiments of the present invention.

As can be understood, embodiments of the present invention include providing parameterized actions in search results and allowing for pre-populating parameter values based on user context. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform a method, the method comprising:
    identifying websites within a particular category;
    identifying a common action performed on the websites within the particular category as a parameterized action, and determining a set of common parameters for the parameterized action by:
        performing for each of the websites within the particular category: selecting a website to provide a selected website, examining user web browsing history information for the selected website, identifying URLs within the web browsing history information with a common pattern, and identifying parameters from the common pattern;
        grouping parameters identified from the web sites within the particular category into clusters;
        identifying the common parameters from the clusters;
    determining a general URL structure for the parameterized action for a first website from the websites within the particular category;
    storing information regarding the parameterized action and the set of common parameters for the parameterized action; and
    storing information regarding the general URL structure for the parameterized action for the first website.

2. The one or more computer storage media of claim 1, wherein grouping parameters into clusters comprises grouping the parameters based on at least one selected from the following: an edit distance of parameter names for the parameters; and values assumed by the parameters at the websites.

3. The one or more computer storage media of claim 1, wherein identifying the common parameters from the clusters comprises selecting a subset of the clusters as the common parameters.

4. The one or more computer storage media of claim 1, wherein determining a general URL structure for the parameterized action for the first website comprises:
    mapping parameters from the first website to the common parameters; and
    generating the general URL structure for the parameterized action for the first website based on a common pattern of URLs in web browsing history information for the first website and based on the mapping of the parameters from the first website to the common parameters.

5. The one or more computer storage media of claim 1, wherein the method further comprises:
    receiving a search query from an end user;
    identifying a web page from the first website in response to the search query by querying a search engine index based on the search query;

identifying the parameterized action associated with the web page and the set of parameters for the parameterized action;
generating a search result that includes an indication of the parameterized action and the parameters for the parameterized action, and UI elements that allow the end user to enter parameter values for the parameters; and
providing the search result for presentation to the end user.

6. The one or more computer storage media of claim 5, wherein the search result is a top search result in a list of search results identified in response to the search query.

7. The one or more computer storage media of claim 5, wherein the method further comprises:
accessing known information regarding the end user; and
pre-populating at least one UI element with a parameter value based on the known information regarding the end user.

8. The one or more computer storage media of claim 5, wherein the method further comprises:
receiving parameter values entered by an end user via the UI elements in the search result;
identifying a known URL structure for the parameterized action; and
generating a URL using the known URL structure and the parameter values.

9. The one or more computer storage media of claim 8, wherein the method further comprises issuing a request using the generated URL.

10. The one or more computer storage media of claim 8 the method further comprises storing the parameter values.

11. The one or more computer storage media of claim 10, wherein the method further comprises:
receiving a second search query from the end user;
identifying a second web page from a second website within the particular category in response to the second search query by querying the search engine index based on the second search query;
identifying the parameterized action associated with the second web page and the set of parameters for the parameterized action;
accessing the stored parameter values;
generating a second search result that includes the parameterized action, an indication of the parameters for the parameterized action, and UI elements that are pre-populated with the stored parameter values for the parameters; and
providing the second search result for presentation to the end user.

12. A method comprising:
identifying a parameterized action common to websites within a particular category, and identifying a set of common parameters for the parameterized action by:
performing for each of the websites within the particular category: selecting a website to provide a selected website, examining user web browsing history information for the selected website, identifying URLs within the web browsing history information with a common pattern, and identifying parameters from the common pattern;
grouping parameters identified from the web sites within the particular category into clusters; and
identifying the common parameters from the clusters;
receiving a search query from an end user;
identifying a web page corresponding with a first website within the particular category in response to the search query;
generating a search result that includes an indication of the parameterized action and the parameters for the parameterized action, the search result also include UI elements that allow the end user to enter parameter values for the parameters;
providing the search result for presentation to the end user;
receiving parameter values entered by the end user into the UI elements of the search result corresponding with the set of parameters for the parameterized action;
generating a URL using the parameter values and a general URL structure for the parameterized action at the first website;
storing the parameter values;
receiving a second search query from the end user;
identifying a second web page corresponding with a second website within the particular category in response to the second search query;
generating a second search result that includes an indication of the parameterized action and the parameters for the parameterized action, the second search result also include UI elements that are pre-populated with the stored parameter values for the parameters; and
providing the second search result for presentation to the end user.

13. The method of claim 12, wherein the method further comprises determining the general URL structure for the parameterized action at the first website by:
mapping parameters from the first website to the common parameters; and
generating the general URL structure for the parameterized action for the first website based on a common pattern of URLs in web browsing history information for the first website and based on the mapping of the parameters from the first website to the common parameters.

14. A computerized system comprising:
one or more processors; and
one or more computer storage media storing computer-useable instructions that, when used by one or more processors, cause the one or more processors to:
identify websites within a particular category;
identify a common action performed on the websites within the particular category as a parameterized action, and determine a set of common parameters for the parameterized action by:
performing for each of the websites within the particular category: selecting a website to provide a selected website, examining user web browsing history information for the selected website, identifying URLs within the web browsing history information with a common pattern, and identifying parameters from the common pattern;
grouping parameters identified from the web sites within the particular category into clusters;
identifying the common parameters from the clusters;
determine a general URL structure for the parameterized action for a first website from the websites within the particular category;
store information regarding the parameterized action and the set of common parameters for the parameterized action; and
store information regarding the general URL structure for the parameterized action for the first website.

15. The system of claim 14, wherein grouping parameters into clusters comprises grouping the parameters based on at least one selected from the following: an edit distance of parameter names for the parameters; and values assumed by the parameters at the websites.

16. The system of claim 14, wherein determining a general URL structure for the parameterized action for the first website comprises:
- mapping parameters from the first website to the common parameters; and
- generating the general URL structure for the parameterized action for the first website based on a common pattern of URLs in web browsing history information for the first website and based on the mapping of the parameters from the first website to the common parameters.

17. The system of claim 14, wherein the method further comprises:
- receiving a search query from an end user;
- identifying a web page from the first website in response to the search query by querying a search engine index based on the search query;
- identifying the parameterized action associated with the web page and the set of parameters for the parameterized action;
- generating a search result that includes an indication of the parameterized action and the parameters for the parameterized action, and UI elements that allow the end user to enter parameter values for the parameters; and
- providing the search result for presentation to the end user.

18. The system of claim 17, wherein the method further comprises:
- accessing known information regarding the end user; and
- pre-populating at least one UI element with a parameter value based on the known information regarding the end user.

19. The system of claim 17, wherein the method further comprises:
- receiving parameter values entered by an end user via the UI elements in the search result;
- identifying a known URL structure for the parameterized action;
- generating a URL using the known URL structure and the parameter values; and
- issuing a request using the generated URL.

20. The system of claim 19, wherein the method further comprises:
- storing the parameter value;
- receiving a second search query from the end user;
- identifying a second web page from a second website within the particular category in response to the second search query by querying the search engine index based on the second search query;
- identifying the parameterized action associated with the second web page and the set of parameters for the parameterized action;
- accessing the stored parameter values;
- generating a second search result that includes the parameterized action, an indication of the parameters for the parameterized action, and UI elements that are pre-populated with the stored parameter values for the parameters; and
- providing the second search result for presentation to the end user.

* * * * *